(12) United States Patent
Woo et al.

(10) Patent No.: US 10,755,472 B2
(45) Date of Patent: Aug. 25, 2020

(54) METHOD AND APPARATUS FOR DISPLAYING IMAGE BASED ON USER MOTION INFORMATION

(71) Applicant: Samsung Electronics Co., Ltd., Gyeonggi-do (KR)

(72) Inventors: Ji-Hwan Woo, Seoul (KR); Eric Yip, Seoul (KR); Byeong-Doo Choi, Gyeonggi-do (KR); Dong-Wook Kwon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 28 days.

(21) Appl. No.: 15/938,816

(22) Filed: Mar. 28, 2018

(65) Prior Publication Data

US 2018/0286109 A1    Oct. 4, 2018

(30) Foreign Application Priority Data

Mar. 28, 2017  (KR) ........................ 10-2017-0039574

(51) Int. Cl.
*H04N 19/543* (2014.01)
*G06T 15/20* (2011.01)
(Continued)

(52) U.S. Cl.
CPC .......... *G06T 15/205* (2013.01); *G02B 27/017* (2013.01); *G06F 3/011* (2013.01);
(Continued)

(58) Field of Classification Search
CPC ..... H04N 19/543; G06T 15/205; G06T 15/20; G06T 15/30; G06T 19/003; G02B 27/017
See application file for complete search history.

(56) References Cited

U.S. PATENT DOCUMENTS

2013/0194305 A1*  8/2013  Kakuta ................. G06T 19/006
                                                          345/633
2015/0220143 A1*  8/2015  Choi ....................... G06F 3/011
                                                          345/156
(Continued)

OTHER PUBLICATIONS

Choi, Byeongdoo et al., Text of ISO/IEC 23000-20 CD Omnidirectional Media Application Format, ISO/IEC JTC1/SC29/WG11 N16636, Jan. 2017, Geneva, Switzerland, pp. 50.
(Continued)

*Primary Examiner* — Jitesh Patel
(74) *Attorney, Agent, or Firm* — The Farrell Law Firm, P.C.

(57) ABSTRACT

Methods and apparatuses are provided for transmitting information about an omni-directional image based on user motion information by a server. Motion parameters are received from an apparatus worn by a user for displaying an omni-directional image. User motion information is generated based on the received motion parameters. First packing information corresponding to a user position is generated based on the user motion information. Second packing information corresponding to a position in close proximity to the user position is generated based on the user motion information. Third packing information is generated based on the first packing information and the second packing information At least one of the first packing information, the second packing information, and the third packing information is transmitted to the apparatus.

20 Claims, 31 Drawing Sheets

(51) Int. Cl.
   G02B 27/01    (2006.01)
   G06T 19/00    (2011.01)
   G06F 3/01     (2006.01)
(52) U.S. Cl.
   CPC ............ G06T 15/20 (2013.01); G06T 19/003 (2013.01); H04N 19/543 (2014.11)

(56) References Cited

U.S. PATENT DOCUMENTS

| | | | |
|---|---|---|---|
| 2016/0037178 A1* | 2/2016 | Lee | H04N 19/30 375/240.12 |
| 2016/0227251 A1* | 8/2016 | Lee | H04N 19/597 |
| 2016/0238852 A1 | 8/2016 | Ellsworth et al. | |
| 2016/0260251 A1 | 9/2016 | Stafford et al. | |
| 2016/0352791 A1 | 12/2016 | Adams et al. | |
| 2017/0075416 A1 | 3/2017 | Armstrong | |
| 2017/0280126 A1* | 9/2017 | Van der Auwera | G06T 3/0062 |

OTHER PUBLICATIONS

Peng Wang et al., "AHG 8: A Viewport-based Pyramid Projection for VR360 Video Streaming", Joint Video Exploration Team (JVET) of ITU-T SG 16 WP 3 and ISO/IEC JTC 1/SC 29/WG 11, Document: JVET-E0058, Jan. 12-20, 2017, 5 pages.

International Search Report dated Jun. 1, 2018 issued in counterpart application No. PCT/KR2018/002613, 13 pages.

* cited by examiner (a) Spherical model (b) Cube projection (c) packing(a net of cube)

(a) 4x3 packing

| padding | top | padding |
| front | right | back | left |
| padding | bottom | padding |

(b) 3x2 packing

| front | right | back |
| top | bottom | left |

(c) weighted packing

| front | top |
| | right |
| back | left | bottom |

FIG.11B (a) Spherical coordinate (b) Truncated pyramid projection (c) Trapezoid packing (a1)

(a2)

(b1)

(b2)

(c1)

(c2)

(d1)

(d2)

(a) Spherical model (b) Cube projection (c) Cube packing(a net of cube)

(a) Spherical model (b) Truncated pyramid projection (c) Trapezoid packing (a) Spherical model (b) Truncated pyramid projection (c) Trapezoid packing

METHOD AND APPARATUS FOR DISPLAYING IMAGE BASED ON USER MOTION INFORMATION

CROSS-REFERENCE TO RELATED APPLICATION(S)

This application is based on and claims priority under 35 U.S.C. § 119(a) to Korean Patent Application No. 10-2017-0039574, filed in the Korean Intellectual Property Office on Mar. 28, 2017, the disclosure of which is incorporated herein by reference.

BACKGROUND

1. Field

The present disclosure relates generally to a method and an apparatus for displaying an image, and more particularly, to a method and an apparatus for displaying an image based on user motion information.

2. Description of the Related Art

The Internet is now evolving into the Internet of things (IoT) where distributed entities, such as things, exchange and process information without human intervention. The Internet of everything (IoE) has emerged, which is a combination of IoT technology and Big Data processing technology through connection with a cloud server. As technology elements, such as, for example, sensing technology, wired/wireless communication and network infrastructure, service interface technology, and security technology, have been demanded IoT implementation, research has been conducted for a sensor network, machine-to-machine (M2M) communication, and machine type communication (MTC), for example.

An IoT environment may provide intelligent Internet technology services that create a new value by collecting and analyzing data generated among connected things. IoT may be applied to a variety of fields including, for example, smart home, smart building, smart city, smart car or connected cars, smart grid, health care, smart appliances, and advanced medical services, through convergence and combination of existing information technology (IT) and industrial applications. Controlling IoT devices in an IoT environment may not be user friendly. For example, a user may have difficulty recognizing an IoT device in the IoT environment, difficulty in connecting to the IoT device, and difficulty in controlling the IoT device.

Along with the recent development of virtual reality (VR) technology, the importance of displaying an immersive image in VR has been increasing. At present, it is necessary to display an image naturally according to a user motion considering the limitation of the image data usage in VR.

VR refers to a specific environment or situation, which is realistic but not real, created by computer-based artificial techniques, or a technology that creates the environment or situation. An environment or situation that is provided as VR content to a user enables the user to get a realistic spatial and temporal experience by stimulating the senses of the user. Further, the user may interact with objects realized in VR content by manipulating a real device or executing a command by means of the real device. The user may also simply be immersed in the VR content. VR content differs from a one-sided simulation in that the VR content enables interaction with a user and creates a user experience.

VR content may be provided to a user through a VR device. One such VR device is a head-mounted display (HMD) mounted on the head of a user, with VR content displayed on a display screen, which is disposed in front of the eyes of the user.

The user may move the head in various directions, using the VR device, and a direction in which the user views may be changed according to such a motion. Further, the user may move, wearing the VR device, and the VR device changes a VR image based on the motion of the user, thereby providing realistic VR content.

SUMMARY

The present disclosure has been made to address at least the above-described problems and/or disadvantages and to provide at least the advantages described below. Accordingly, an aspect of the present disclosure provides a method and an apparatus for displaying VR content naturally based on a user motion in VR.

Another aspect of the present disclosure provides a system for providing a natural image matching a point of view (PoV) of a user according to a user motion, for 6 degrees of freedom (6 DoF) viewing.

In accordance with an aspect of the present disclosure, a method is provided for transmitting information about an omni-directional image, by a server, based on user motion information. The method includes receiving, by a transceiver of the server, motion parameters from an apparatus for displaying an omni-directional image display device, the apparatus being worn by a user. A processor of the server generates user motion information based on the received motion parameters. The processor generates first packing information corresponding to a user position based on the user motion information. The processor generates second packing information corresponding to a position in close proximity to the user position based on the user motion information. The processor generates third packing information based on the first packing information and the second packing information. At least one of the first packing information, the second packing information, and the third packing information is transmitted from the transceiver to the apparatus.

In accordance with another aspect of the present disclosure, a server is provided for transmitting information about an omni-directional image based on user motion information. The server includes a memory, and at least one processor connected to the memory. The at least one processor is configured to receive motion parameters from an apparatus for displaying an omni-directional image, the apparatus being worn by a user. The at least one processor is also configured to generate user motion information based on the received motion parameters. The at least one processor is further configured to generate first packing information corresponding to a user position based on the user motion information, to generate second packing information corresponding to a position in close proximity to the user position based on the user motion information, and generate third packing information based on the first packing information and the second packing information. The at least one processor is additionally configured to transmit at least one of the first packing information, the second packing information, and the third packing information to the apparatus.

In accordance with another aspect of the present disclosure, a method is provided for displaying an image based on user motion information by an apparatus for displaying an omni-directional image and worn by a user. A transceiver of the apparatus transmits, to a server, motion parameters obtained by analyzing a user motion, and receives packing information from the server. A processor of the apparatus renders a VR image based on the received packing information, and displays the rendered VR image. The server is configured to generate user motion information based on the motion parameters, generate first packing information corresponding to a user position based on the user motion information, generate second packing information corresponding to a position in close proximity to the user position based on the user motion information, and generate third packing information based on the first packing information and the second packing information. The packing information includes at least one of the first packing information, the second packing information, and the third packing information.

In accordance with another aspect of the present disclosure, an apparatus worn by a user is provided for displaying an omni-directional image based on user motion information. The apparatus includes a memory, and at least one processor connected to the memory. The at least one processor is configured to transmit, to a server, motion parameters obtained by analyzing a user motion, receive packing information from the server, render a VR image based on the received packing information, and display the rendered VR image. The server is configured to generate user motion information based on the motion parameters, generate first packing information corresponding to a user position based on the user motion information, generate second packing information corresponding to a position in close proximity to the user position based on the user motion information, and generate third packing information based on the first packing information and the second packing information. The packing information includes at least one of the first packing information, the second packing information, and the third packing information.

BRIEF DESCRIPTION OF THE DRAWINGS

The above and other aspects, features, and advantages of certain embodiments of the present disclosure will be more apparent from the following detailed description when taken in conjunction with the accompanying drawings, in which:

FIGS. 11A, 11B, 11C, 11D, and 11E diagrams illustrating various projection methods and packing methods;

DETAILED DESCRIPTION

Figure 1:
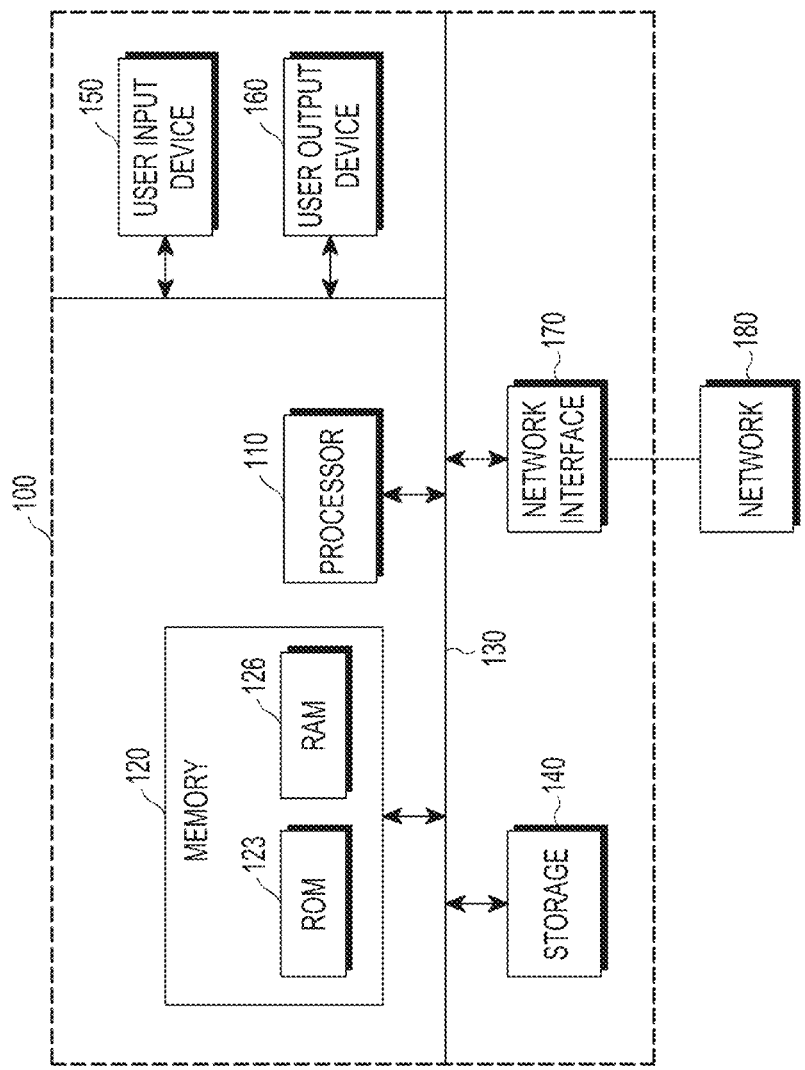
FIG. 1 is a block diagram illustrating the structure of a computer system for performing a method for displaying an image based on user motion information, according to an embodiment.

Embodiments of the present disclosure are described in detail below with reference to the attached drawings. The same or similar components may be designated by the same or similar reference numerals although they are illustrated in different drawings. Detailed descriptions of constructions or processes known in the art may be omitted to avoid obscuring the subject matter of the present disclosure.

Although the terms used herein are defined in consideration of functions in the embodiments, the terms may be changed according to the intention of a user or an operator, or customs. Therefore, the present disclosure should be understood, not simply by the actual terms used but by the meanings of each term lying within.

FIG. 1 is a block diagram illustrating the structure of a computer system for performing a method for displaying an image based on user motion information, according to an embodiment.

A method for displaying an image based on user motion information may be implemented in a computer system 100 or recorded to a recording medium. As illustrated in FIG. 1, the computer system 100 includes at least one processor 110 and a memory 120.

The at least one processor 110 may be a central processing unit (CPU) or a semiconductor device that processes a command stored in the memory 120.

The at least one processor 110 may be a controller that controls all operations of the computer system 100. The controller may perform operations of the computer system 100 by reading a program code stored in the memory 120 and executing the read program code.

The computer system 100 further includes at least one of a user input device 150, a data communication bus 130, and a user output device 160. Each of the foregoing components may conduct data communication via the data communication bus 130.

The computer system 100 further includes a network interface 170 connected to a network 180.

The memory 120 includes various types of volatile or non-volatile storage media. For example, the memory 120 includes a read only memory (ROM) 123 and a random access memory (RAM) 126.

Accordingly, the method for displaying an image based on user motion information may be implemented as a computer-executable method. If the method for displaying an image based on user motion information is implemented in a computer device, computer-readable instructions may execute an operation method according to the present disclosure.

The method for displaying an image based on user motion information may be implemented as computer-readable code in a computer-readable recording medium. The computer-readable recording medium may include any type of recording medium storing data interpretable by the computer system 100, such as, for example, ROM, RAM, magnetic tape, magnetic disk, flash memory, and optical data storage. Additionally, the computer-readable recording medium may be distributed over the computer system 100 connected to a computer communication network so that computer-readable code is written thereto and executed therefrom in a decentralized manner.

Figure 2:
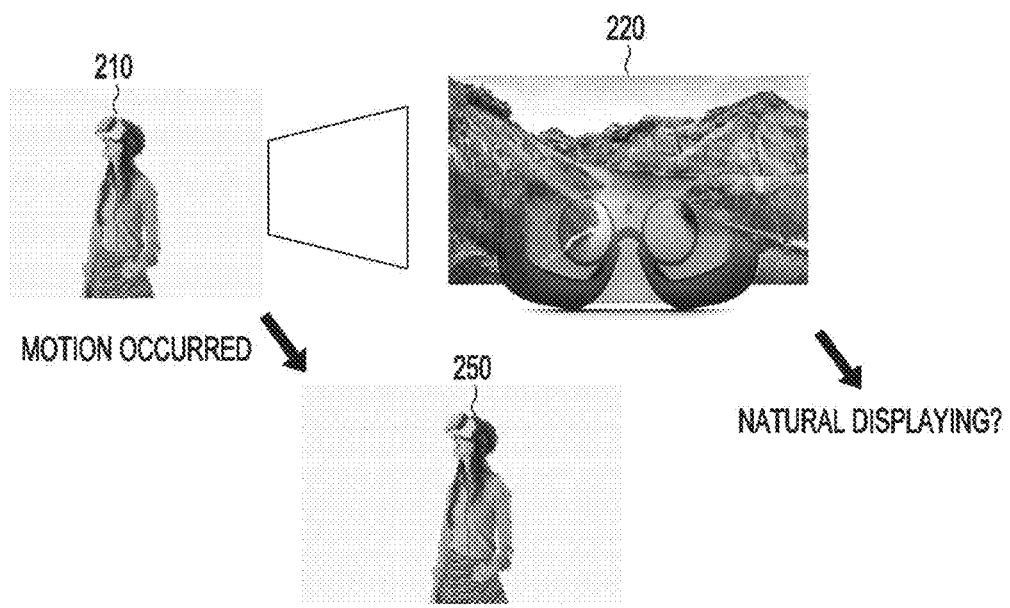
FIG. 2 is a diagram illustrating a method for naturally displaying content generated at a position to which a user has moved by a user motion detection technique.

FIG. 2 is a diagram illustrating a method for naturally displaying VR content corresponding to a position to which a user has moved by a user motion detection technique.

According to an embodiment, a user motion may be detected, and VR content corresponding to a user position may be naturally displayed based on the detected user motion. The user motion may include at least one of a user position, a user gaze direction, a user movement direction, and a user speed. For example, a user may move from a first position 210 to a second position 250, and an HMD device may detect the user motion, determining that the user has moved. The user may move to the second position 250, while viewing an image 220 displayed at the first position 210 by the HMD device. The HMD device should be able to provide an image displayed at the second position 250 in such a manner that the image displayed at the first position 220 may be seamlessly connected to the image displayed at the second position 250.

Figure 3:
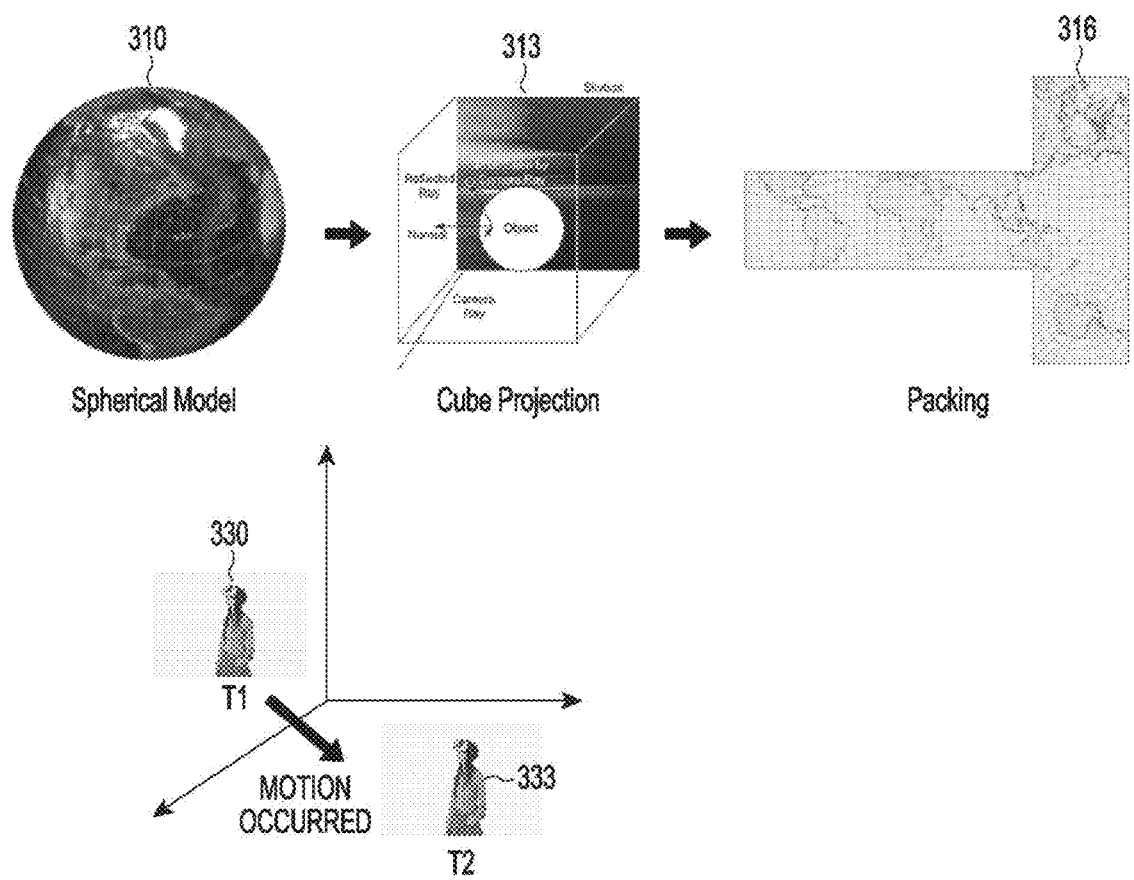
FIG. 3 is a diagram illustrating a method for displaying an image based on user motion information in VR, according to an embodiment.

FIG. 3 is diagram illustrating a method for displaying an image based on user motion information in VR, according to an embodiment.

To display a natural image according to a user motion in VR, user motion-based rendering is required. Optimal projection data (information) matching the user motion may be generated, and packed data (information) corresponding to the projection data may be generated and transmitted.

How a projection method and a packing method are to be applied is an issue in the present disclosure. Further, if a conventional packed image is modified, image degradation may occur because the image has already been encoded and decoded.

According to the present disclosure, image degradation may be decreased by using a method in which packed data is generated according to a user motion by legacy cube projection and the generated packed data is transmitted.

Cube projection 313 is a projection method of an image displayed on a virtual spherical surface of a spherical model 310 onto each face of a cube, thus acquiring a two-dimensional (2D) image on each face in the form of a net of cube.

While the user moves from a first position T1 330 to a second position T2 333, a method is proposed for generating projection data and packed data according to a user motion by cube projection.

Figure 4:
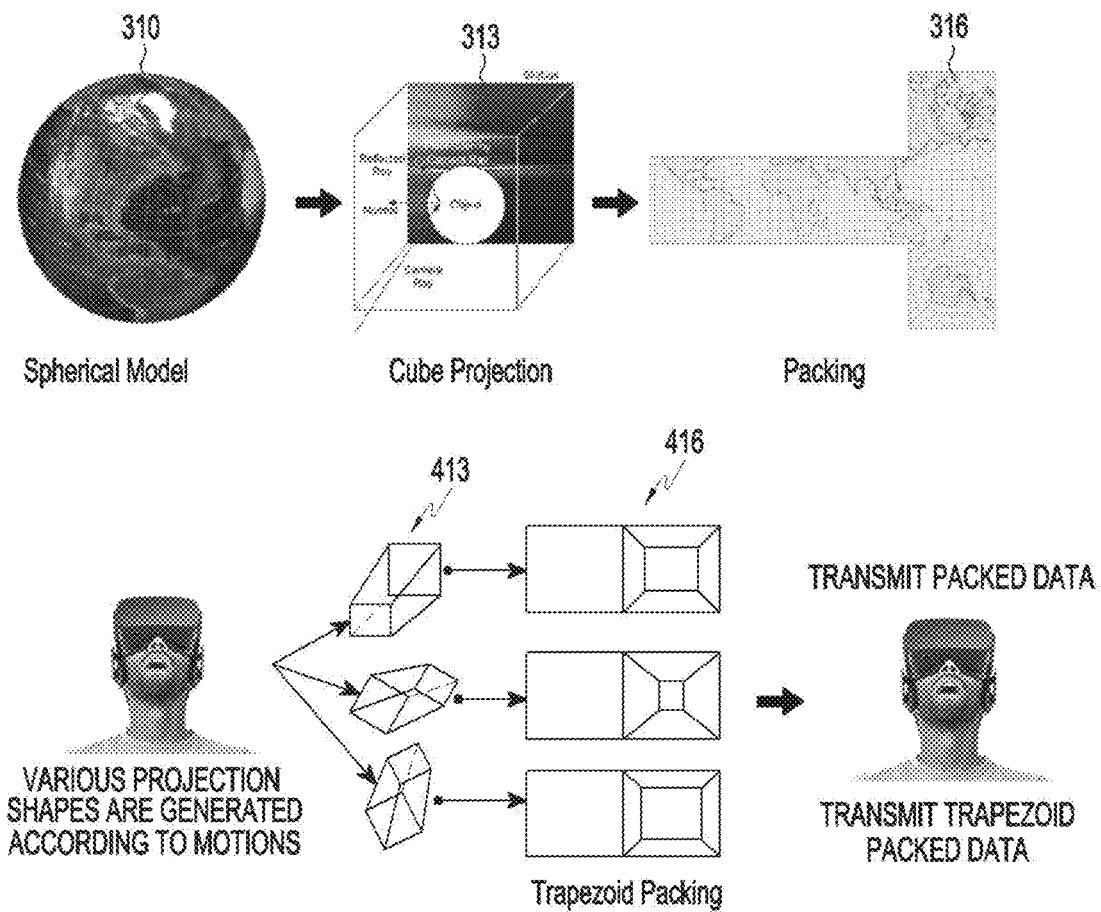
FIG. 4 is a diagram illustrating a method for displaying an image based on user motion information in VR, according to another embodiment.

FIG. 4 is a diagram illustrating a method for displaying an image based on user motion information in VR, according to another embodiment.

In FIG. 4, the cube projection 313 is compared with truncated square pyramid (TSP) projection 413, using a spherical model.

Packed data 316, including images projected on 6 square regions, is generated based on cube projection. Various TSP projections are generated according to user motions, and packed data 416, including trapezoid images, is generated based on the TSP projections.

Additionally, in the case of TSP projection, various projection shapes may be generated according to user motions.

According to a user motion, the PoV of the user may be changed, and trapezoid packed data, varying according to the PoV, may be generated. In VR, packed data based on a user motion may be transmitted by using the generated trapezoid packed data.

Figure 5:
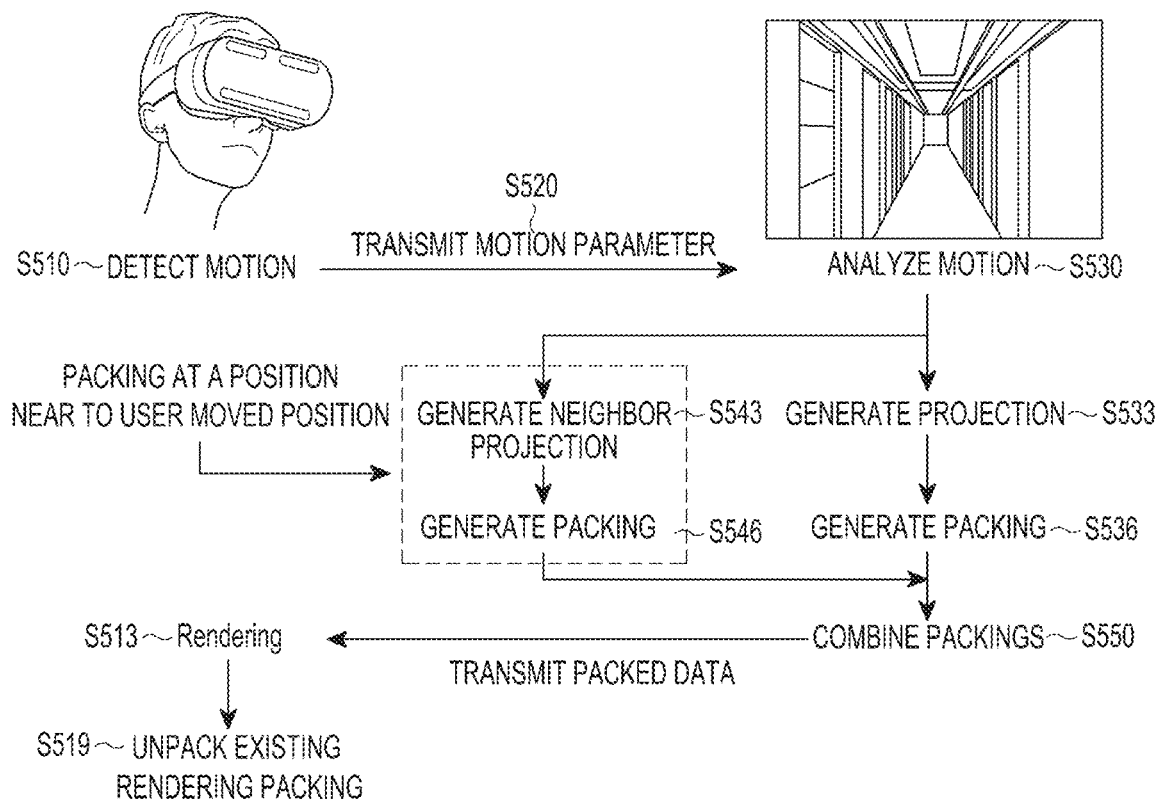
FIG. 5 is a flowchart illustrating a method for displaying an image based on user motion information in VR, according to an embodiment.

FIG. 5 is a flowchart illustrating a method for displaying an image based on user motion information in VR, according to an embodiment.

The method for displaying an image based on user motion information in VR includes obtaining user motion information, in step S510, transmitting motion parameters generated based on the obtained motion information, in step S520, analyzing a user motion based on the motion parameters, in step S530, generating first projection information and first packing information corresponding to a user position, in steps S533 and S536, generating second projection information and second packing information corresponding to a position near to the user position, in steps S543 and S546, generating third packing information by combining the generated first packing information with second packing information, in step S550, rendering the generated third packing information, in step S513, and unpacking the third packing information, in step S519.

The motion information may include information about at least one angle at a PoV changed from a reference PoV, and a user movement distance (a moving distance of a user). The at least one angle may be three-dimensional (3D) Euler angles.

Figure 6:
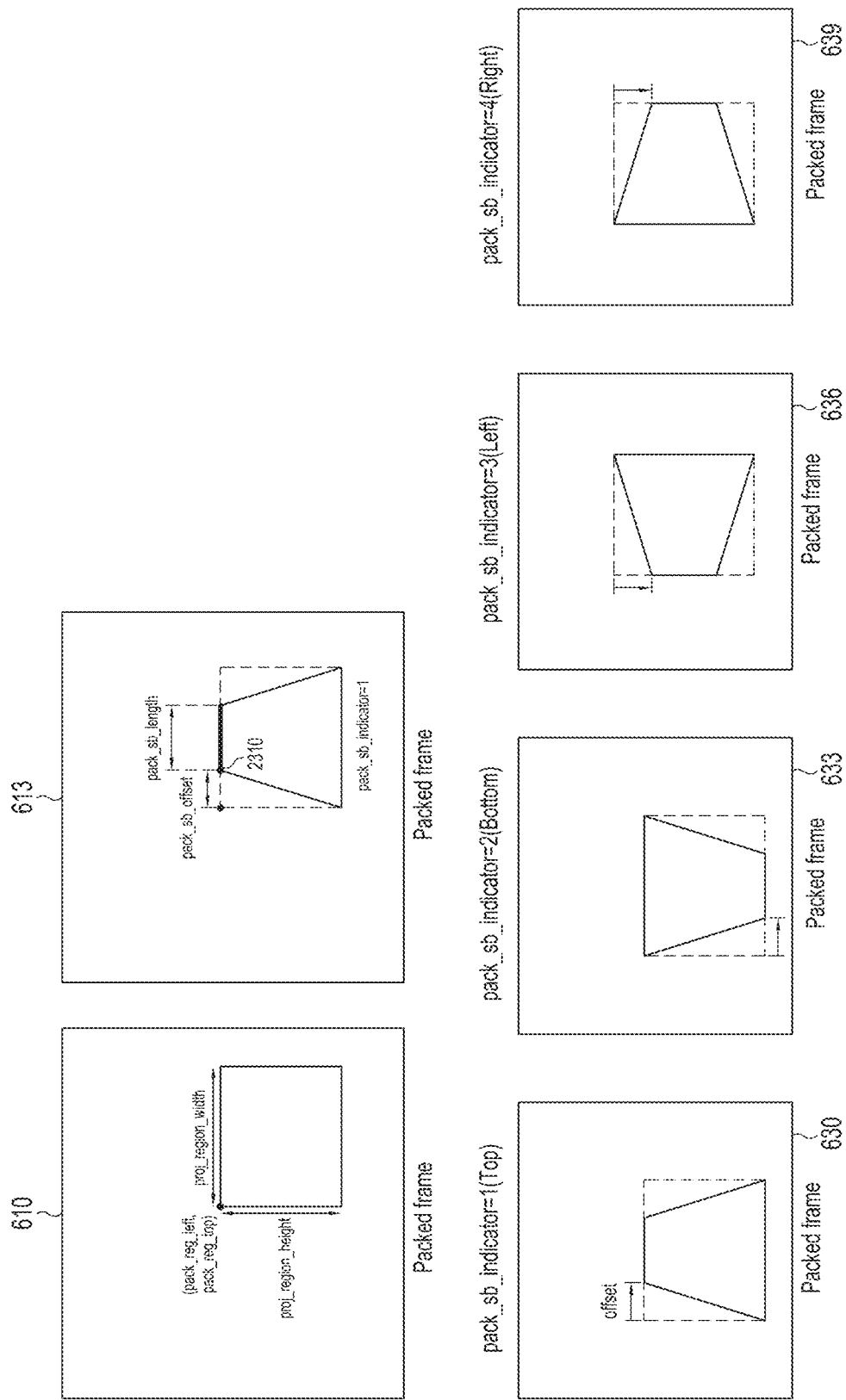
FIG. 6 is a diagram illustrating a trapezoid packing method, according to a partial embodiment.

FIG. 6 is diagrams illustrating a trapezoid packing method, according to a partial embodiment.

The trapezoid packing method may represent various packings, such as, for example, triangle packing, trapezoid packing, and square packing, according to parameter adjustment. A projection, such as, for example, icosahedral projection (ISP) used as a 360-degree image processing method, octahedron projection (OHP), truncated pyramid projection, and exchangeable partition probability function (EPPF), may be packed by trapezoid packing.

The packed frame is a rectangle, as shown in block 610. The rectangular frame is converted to a packed trapezoidal frame, in block 613.

If pack_sb_indicator is 1, this indicates that the shorter base of a trapezoid is the top side, as shown in block 630. If pack_sb_indicator is 2, this indicates that the shorter base of the trapezoid is the bottom side, as shown in block 633. If pack_sb_indicator is 3, this indicates that the shorter base of the trapezoid is the left side, as shown in block 636. If pack_sb_indicator is 4, this indicates that the shorter base of the trapezoid is the right side, as shown in block 639.

Figure 7:
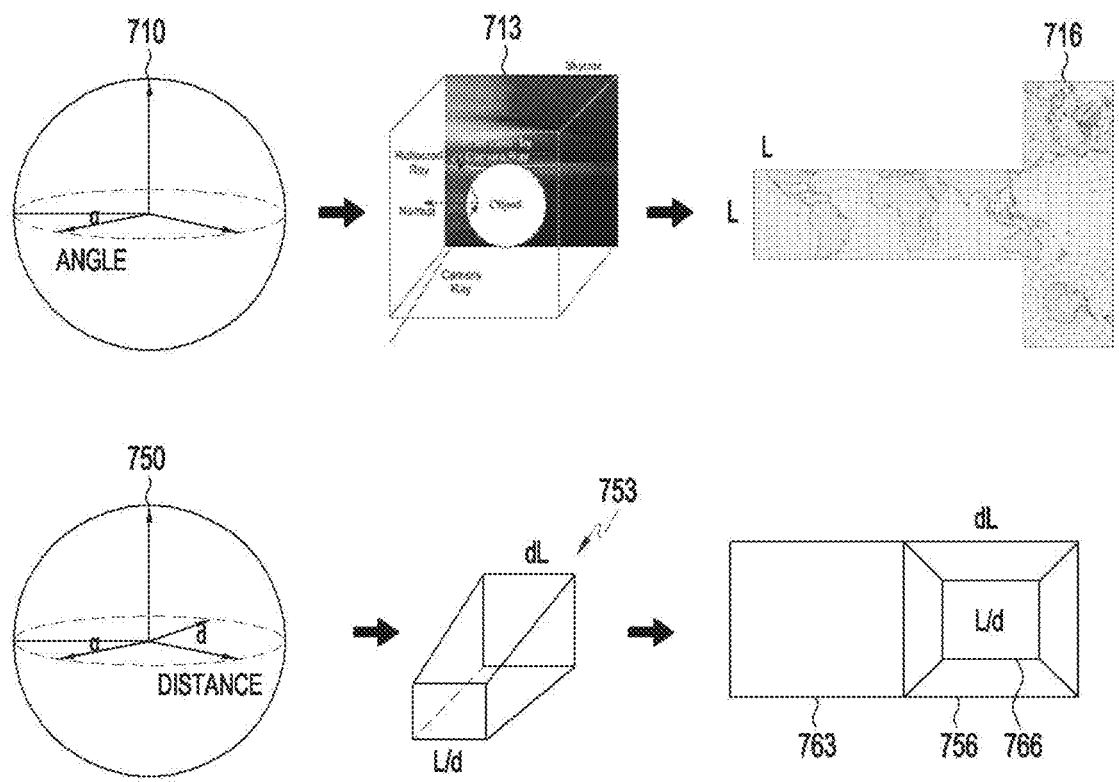
FIG. 7 is a diagram illustrating a projection change caused by a user motion, according to a partial embodiment.

FIG. 7 is a diagram illustrating a projection change caused by a user motion, according to a partial embodiment.

According to cube projection 713, the surface of a sphere 710 is divided into 6 equal surfaces, and each of the 6 surfaces is projected onto a square. According to cube projection, the same weight may be applied to every surface, and an omni-directional image may be represented. Packed data 716, based on the cube projection 713, includes images corresponding to the 6 surfaces. TSP projection 753 of a sphere 750, according to an embodiment, may set the length of one side of a face 763 close to a position to which the user has moved to be long, and the length of one side of a face 766 far from the position to which the user has moved to be short by applying a user movement distance. The other faces may be shaped into trapezoids. Packed data 756 may be generated by relocating each face. While the nearby and far faces may be, but not limited to, squares, the nearby and far surfaces may be rectangles.

Figure 8:
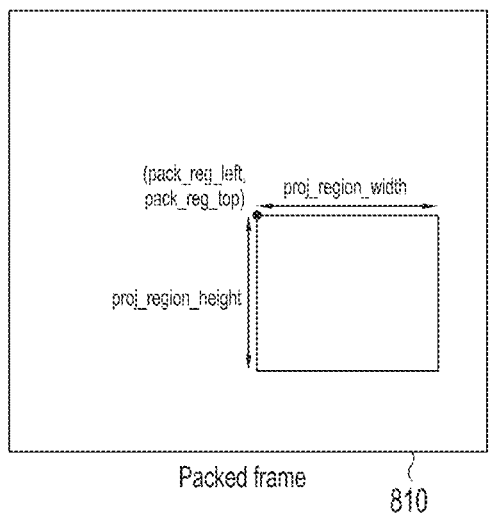
FIG. 8 is a diagram illustrating a packing change caused by a user motion, according to a partial embodiment.
Figure 8:
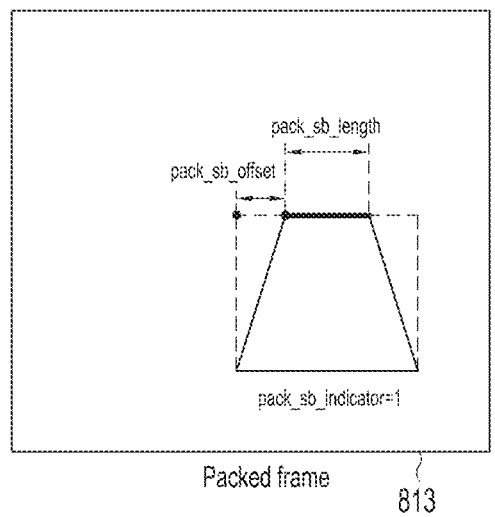
Figure 8:
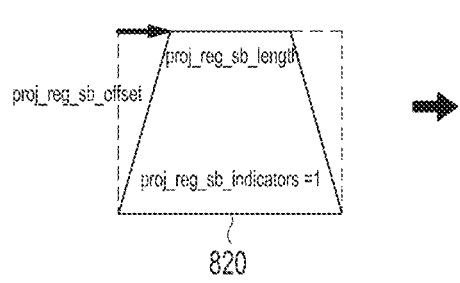
Figure 8:
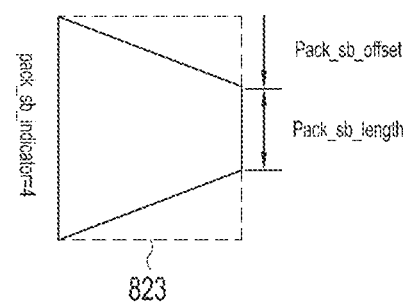

FIG. 8 is a diagram illustrating a packing change caused by a user motion, according to a partial embodiment.

According to a user motion, the distance and angle between the user and an object of observation are changed. Estimation of a position in the Cartesian coordinate system may be changed by trapezoid packing. To change coordinates in the Cartesian coordinate system by trapezoid packing, rotation and scaling parameters may be calculated so that an image may be displayed according to the user motion.

To generate a projected image or packed image corresponding to an omni-directional image, a trapezoidal image is generated in a packing process, as shown in blocks 810 and 813, and a trapezoidal image is generated in a projection process, as shown in blocks 820 and 823. That is, a trapezoidal image may be generated selectively by packing process or projection process. To support the trapezoid packing method, it is necessary to provide a syntax including proj_reg_sb_offset, proj_reg_sb_length, pack_reg_sb_offset, and pack_reg_sb_length.

Table 1 describes a syntax for the trapezoid packing method.

TABLE 1

```
aligned(8) class RegionWisePackingBox extends Box('rwpk') {
        RegionWisePackingStruct( );
}
aligned(8) class RegionWisePackingStruct {
        unsigned int(8) num_regions;
        unsigned int(32) proj_frame_width;
        unsigned int(32) proj_frame_height;
        for (i = 0; i < num_regions; i++) {
                bit(4) reserved = 0;
                unsigned int(4) packing_type[i];
        }
        for (i = 0; i < num_regions; i++) {
                if (packing_type[i] == 0)
                        RectRegionPacking(i);
                if (packing_type[i] = 1)
                        TrapezoidRegionPacking(i);
        }
}
aligned(8) class TrapezoidRegionPacking(i) {
        unsigned int(32) proj_reg_width[i];
        unsigned int(32) proj_reg_height[i];
        unsigned int(32) proj_reg_top[i];
        unsigned int(32) proj_reg_left[i];
        unsigned int(8) proj_reg_sb_indicator[i];
        if (proj_reg_sb_indicator[i]>0) {
                unsigned int(32) proj_reg_sb_offset[i];
                unsigned int(32) proj_reg_sb_length[i];
        }
        unsigned int(8) flip[i];
        unsigned int(8) rotation[i];
        unsigned int(32) pack_reg_width[i];
        unsigned int(32) pack_reg_height[i];
        unsigned int(32) pack_reg_top[i];
        unsigned int(32) pack_reg_left[i];
        unsigned int(8) pack_reg_sb_indicator[i];
        if (pack_reg_sb_indicator[i]>0) {
                unsigned int(32) pack_reg_sb_offset[i];
                unsigned int(32) pack_reg_sb_length[i];
        }
}
```

Table 2 describes the semantics of the above syntax.

TABLE 2 proj_reg_width[i], proj_reg_height[i], proj_reg_top[i] and proj_reg_left[i] are indicated in units of pixels in a projected frame with width and height equal to proj_frame_width and proj_frame_height, respectively.
proj_reg_width[i] specifies the width of the i-th region of the projected frame.
proj_reg_width[i] shall be greater than 0.
proj_reg_height[i] specifies the height of the i-th region of the projected frame.
proj_reg_height[i] shall be greater than 0.
proj_reg_top[i] and proj_reg_left[i] specify the top sample row and the left-most sample column in the projected frame. The values shall be in the range from 0, inclusive, indicating the top-left corner of the projected frame, to proj_frame_height and proj_frame_width, exclusive, respectively.
proj_reg_width[i] and proj_reg_left[i] shall be constrained such that proj_reg_width[i] + proj_reg_left[i] is less than proj_frame_width.
proj_reg_height[i] and proj_reg_top[i] shall be constrained such that proj_reg_height[i] + proj_reg_top[i] is less than proj_frame_height.
When the projected frame is stereoscopic, proj_reg_width[i], proj_reg_height[i], proj_reg_top[i] and proj_reg_left[i] shall be such that the region identified by these fields on the projected frame is within a single constituent frame of the projected frame.

TABLE 2-continued proj_reg_sb_indicators[i] specifies a side of the rectangle to be the shorter base for the i-th region in the projected frame. When proj_reg_sb_indicators[i] is equal to 0, the i-th region is defined by a rectangle shape. proj_reg_sb_indicators[i] larger than 0 specifies that the i-th region is defined by a trapezoid shape where the side to be the shorter based(base?) is defined as
    0: no shorter base (rectangular region)
    1: top side
    2: bottom side
    3: left side
    4: right side
proj_reg_sb_offset[i] specifies the distance from a vertex of a rectangle to the start point of the shorter base for the i-th region in the projected frame.
proj_reg_sb_length[i] specifies the length of the shorter base for the i-th region in the projected frame. proj_reg_sb_length[i] equal to 1 indicates that i-th region means triangle.
flip[i] equal to 0 indicates that the i-th region is not flipped. flip[i] equal to 1 indicates that the i-th region is horizontally flipped. flip[i] equal to 2 indicates that the i-th region is vertically flipped. Other values are reserved.
rotation[i] indicates the angle for rotation of i-th region along to the center of i-th region. The value 0 indicates that i-th region has not been rotated. The value 1 indicates that i-th region has been rotated 90 degree to the counter clockwise direction. The value 2 indicates that i-th region has been rotated 180 degree to the counter clockwise direction. The value 3 indicates that i-th region has been rotated 270 degree to the counter clockwise direction. The value 4 indicates that i-th region has been rotated 45 degree to the counter clockwise direction. The value 5 indicates that i-th region has been rotated 135 degree to the counter clockwise direction. The value 6 indicates that i-th region has been rotated 225 degree to the counter clockwise direction. The value 7 indicates that i-th region has been rotated 315 degree to the counter clockwise direction. The i-th region in the projected frame is rotated after flipped, and relocated into the packed frame.
pack_reg_width[i], pack_reg_height[i], pack_reg_top[i], and pack_reg_left[i] specify the width, height, the top sample row, and the left-most sample column, respectively, of the region in the packed frame.
pack_reg_sb_indicators[i] specifies a side of the rectangle to be the shorter base for the i-th region in the packed frame. When pack_reg_sb_indicators[i] is equal to 0, the i-th region is defined by a rectangle shape. pack_reg_sb_indicators[i] larger than 0 specifies that the i-th region is defined by a trapezoid shape where the side to be the shorter base is defined as
    0: no shorter base (rectangular region)
    1: top side
    2: bottom side
    3: left side
    4: right side
pack_reg_sb_offset[i] specifies the distance from a vertex of a rectangle to the start point of the shorter base for the i-th region in the packed frame.
pack_reg_sb_length[i] specifies the length of the shorter base for the i-th region in the packed frame.

A projected frame includes, for example, all six faces of a cube projection. The six faces of the cube projection may be referred to as regions of the projected frame.

proj_reg_width[i], proj_reg_height[i], proj_reg_top[i] and proj_reg_left[i] are indicated in units of pixels in the projected frame. The width and height of the projected frame are equal to proj_frame_width and proj_frame_height, respectively.

proj_reg_width[i] specifies the width of an i-th region of the projected frame. proj_reg_width[i] is greater than 0.

proj_reg_height[i] specifies the height of the i-th region of the projected frame. proj_reg_height[i] is greater than 0.

proj_reg_top[i] specifies a vertical position in the i-th region in the projected frame. proj_reg_top[i] is equal to or greater than 0. If proj_reg_top[i] is 0, this indicates the highest position in the projected frame.

proj_reg_left[i] specifies a horizontal position in the i-th region in the projected frame. proj_reg_left[i] is equal to or greater than 0. If proj_reg_left[i] is 0, this indicates the leftmost position in the projected frame.

The top leftmost coordinates of the projected frame are (0, 0), and the bottom rightmost coordinates of the projected frame are (proj_frame_height−1, proj_frame_width−1).

proj_reg_width[i] and proj_reg_left[i] are constrained such that proj_reg_width[i]+proj_reg_left[i] is less than proj_frame_width.

If the projected frame has a plurality of views, proj_reg_width[i], proj_reg_height[i], proj_reg_top[i] and proj_reg_left[i] identify the region, and the region on the projected frame is within a single constituent frame of the projected frame.

proj_reg_sb_indicators[i] specifies a side of the rectangle of the i-th region in the projected frame to be the shorter base of the rectangle.

If proj_reg_sb_indicators[i] is equal to 0, the i-th region is a rectangle. If proj_reg_sb_indicators[i] larger than 0, the i-th region is a trapezoid.

The trapezoid shapes defined by proj_reg_sb_indicators[i] are listed in Table 3 below.

TABLE 3

| proj_reg_sb_indicators[i] | Shorter base (shape) |
| --- | --- |
| 0 | No shorter base (rectangle) |
| 1 | top side |
| 2 | bottom side |
| 3 | left side |
| 4 | right side | proj_reg_sb_offset[i] specifies the distance from a vertex of a rectangle to the start point of the shorter base of the i-th region in the projected frame.

proj_reg_sb_length[i] specifies the length of the shorter base of the i-th region in the projected frame.

If flip[i] is equal to 0, this indicates that the i-th region is not flipped. If a region is flipped, an image of the region is reflected horizontally or vertically on a mirror. If flip[i] is equal to 1, this indicates that the i-th region is horizontally flipped. If flip[i] is equal to 2, this indicates that the i-th region is vertically flipped. Other values are reserved.

rotation[i] indicates an angle for rotation of the i-th region with respect to the center of i-th region. If rotation[i] is 0, this indicates that i-th region has not been rotated. If rotation[i] is 1, this indicates that the i-th region has been rotated by 90 degrees in the counter clockwise direction. If rotation[i] is 2, this indicates that the i-th region has been rotated by 180 degrees in the counter clockwise direction. If rotation[i] is 3, this indicates that the i-th region has been rotated by 270 degrees in the counter clockwise direction. If rotation[i] is 4, this indicates that the i-th region has been rotated by 45 degrees in the counter clockwise direction. If rotation[i] is 5, this indicates that the i-th region has been rotated by 135 degrees in the counter clockwise direction. If rotation[i] is 6, this indicates that the i-th region has been rotated by 225 degrees in the counter clockwise direction. If rotation[i] is 7, this indicates that the i-th region has been rotated by 315 degrees in the counter clockwise direction.

The i-th region in the projected frame may be rotated after flipped, and relocated into the packed frame.

The packed frame includes, for example, all faces corresponding to six faces of a cube projection. The faces may be referred to as regions of the packed frame.

pack_reg_width[i], pack_reg_height[i], pack_reg_top[i], and pack_reg_left[i] specify the width, height, the top position, and the leftmost position, respectively, of the region in the packed frame.

pack_reg_sb_indicators[i] specifies a side of a rectangle to be the shorter base of the i-th region in the packed frame. When pack_reg_sb_indicators[i] is equal to 0, the i-th region is a rectangle. If pack_reg_sb_indicators[i] is greater than 0, the i-th region is a trapezoid.

The trapezoid shapes defined by pack_reg_sb_indicators [i] are listed in Table 4 below.

TABLE 4

| proj_reg_sb_indicators[i] | Shorter base (shape) |
|---|---|
| 0 | No shorter base (rectangle) |
| 1 | top side |
| 2 | bottom side |
| 3 | left side |
| 4 | right side | pack_reg_sb_offset[i] specifies the distance from a vertex of a rectangle to the start point of the shorter base of the i-th region in the packed frame.

pack_reg_sb_length[i] specifies the length of the shorter base of the i-th region in the packed frame.

Transform_type[i] specifies rotation and mirroring (inversion, mirroring, or flip) applied for mapping the i-th-region of a projected frame to the packed frame. If Transform_type [i] specifies both rotation and mirroring, the rotation is applied after the mirroring. Table 5 lists specified values, and other values are reserved.

TABLE 5

| Value | Semantics |
|---|---|
| 1 | no transform |
| 2 | Mirroring horizontally |
| 3 | rotation by 180 degrees (counter-clockwise) |
| 4 | rotation by 180 degrees (counter-clockwise) after mirroring horizontally |
| 5 | rotation by 90 degrees (counter-clockwise) after mirroring horizontally |
| 6 | rotation by 90 degrees (counter-clockwise) |
| 7 | rotation by 270 degrees (counter-clockwise) after mirroring horizontally |
| 8 | rotation by 270 degrees (counter-clockwise) |

The above values correspond to an EXIF orientation tag. The order of the values should be strictly considered.

flip[i] and rotation[i] listed in Table 1 and Table 2 may perfectly correspond to transform_type[i]. The values of flip[i] and rotation[i] corresponding to transform_type[i] are listed in Table 6 below.

TABLE 6

| Values of Transform_type[i] | corresponding flip[i] | corresponding rotation[i] |
|---|---|---|
| 1 | 0 | 0 |
| 2 | 1 | 0 |
| 3 | 0 | 2 |
| 4 | 1 | 2 |
| 5 | 1 | 1 |
| 6 | 0 | 1 |
| 7 | 1 | 3 |
| 8 | 0 | 3 |

The trapezoid packing method, according to an embodiment, may implement octahedron packing by 45-degree rotation.

The values of flip[i] and rotation[i] corresponding to the octahedron packing are listed in Table 7 below.

TABLE 7

| flip[i] | rotation[i] | Rotation angle |
|---|---|---|
| 0 | 4 | rotation by 45 degrees (counter-clockwise) |
| 0 | 5 | rotation by 135 degrees (counter-clockwise) |
| 0 | 6 | rotation by 225 degrees (counter-clockwise) |
| 0 | 7 | rotation by 315 degrees (counter-clockwise) |
| 1 | 4 | rotation by 45 degrees (counter-clockwise) after mirroring horizontally |
| 1 | 5 | rotation by 135 degrees (counter-clockwise) after mirroring horizontally |
| 1 | 6 | rotation by 225 degrees (counter-clockwise) after mirroring horizontally |
| 1 | 7 | rotation by 315 degrees (counter-clockwise) after mirroring horizontally |

Figure 9:
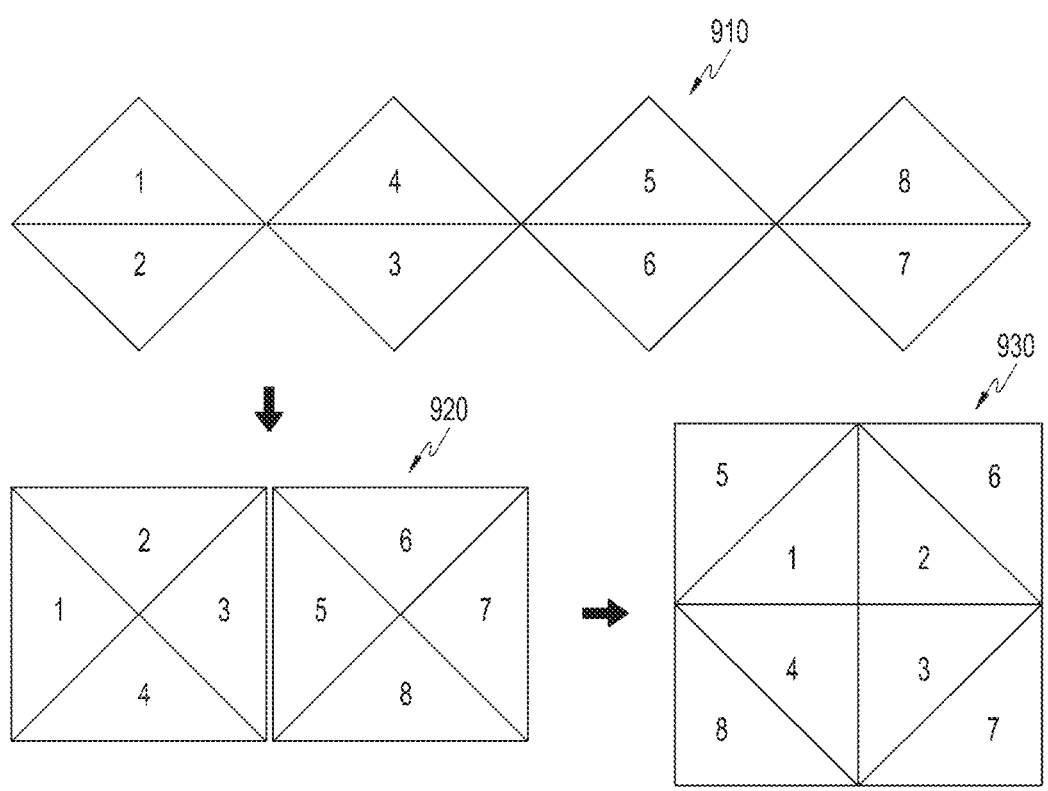
FIG. 9 is a diagram illustrating octahedron packing, according to an embodiment.

FIG. 9 is a diagram illustrating octahedron packing, according to an embodiment.

FIG. 9 illustrates a method for displaying an image based on user motion information according to the octahedron packing method through 45-degree rotation as listed in Table 7.

A frame projected according to a platonic polyhedron projection method may be represented in the form of a net of platonic polyhedron, and the regions of the projected frame may be changed in position and packed by flipping and rotating the net of platonic polyhedron. Packed data (a packed frame) may be generated by packing the regions of the projected frame.

FIG. 9 illustrates a net 910 of octahedron, packed data 920 generated in a packing method using 90-degree rotation, and packed data 930 generated in a packing method using 45-degree rotation.

First, for packing, each face (a regular triangle) of an octahedron may be converted into an isosceles right triangle, and the 8 isosceles right triangles may be converted into rectangles through 90-degree rotation, thereby generating the packed data 920. The packed data 930 may be generated by rotating the packed data 920 by 45 degrees. The packed data 920 is defined by a rectangle, and the packed data 930 is defined by a square.

The aforementioned operations may be performed by providing a memory device storing program code corresponding to the operations in a component of an entity, function, AP, server, or UE in a communication system. That is, a controller of the entity, function, AP, server, or UE may perform the aforementioned operations by reading the program code from the memory device and executing the program code by means of a processor or a CPU.

Figure 10:
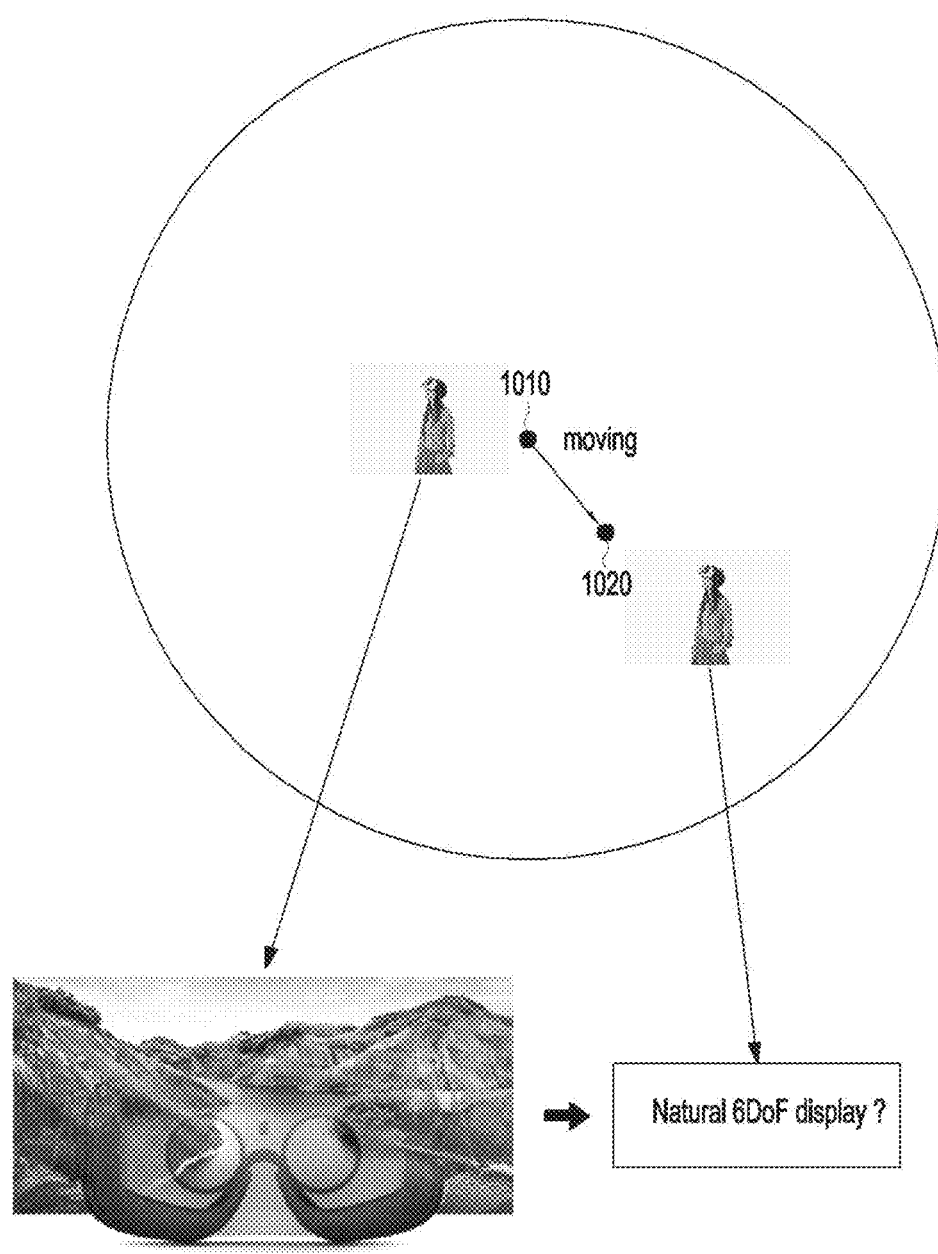
FIG. 10 is a diagram illustrating a method for displaying naturally displaying content corresponding to a position to which a user has moved by a user motion detection technique.

FIG. 10 is a diagram illustrating a method for naturally displaying content corresponding to a position to which a user has moved by a user motion detection technique.

FIG. 10 is a diagram illustrating a method for representing a VR image by using user motion information, according to an embodiment. As illustrated in FIG. 10, a user moves from a first position 1010 to a second position 1020.

The HMD device may display an image, determining that the first position is the origin of the spherical coordinate system. After the user moves to the second position, the HMD device should be able to naturally display an image in consideration of 6 DoF. The present disclosure proposes a projection method and a packing method so that a HMD device may display an image naturally even at a position to which a user has moved. For example, a 360-degree image may be generated in a truncated pyramid method, when a VR image is generated based on user motion information.

The user motion information may include information about at least one of a user position, a user movement distance, a user movement direction, and a user speed. The projection method and packing method related to the VR image may be changed according to the user motion information.

To generate a natural VR image, a TSP projection method and a trapezoid packing method may be used. VR image data may be pre-generated according to packing methods corresponding to user motions, a user motion may be detected, and packed VR image data may be appropriately selected by analyzing the detected user motion.

The user may move along a specific path according to the passage of time. An expected path may be divided into smaller sections, and the same packing method may be applied to the same section. If the user moves in a specific path, the direction of the path may be the direction of the PoV (point of view, or viewpoint) of the user. Thus, a packing method of the disclosure may be determined according to the direction of the path. Since the same packing method is applied to the same section, pre-generated VR images may be reduced. A VR image corresponding to the next section may be pre-generated and prepared.

According to a method for packing a VR image according to the present disclosure, a server may pre-generate packed data expected to be used.

The omnidirectional media application format (OMAF) standard for VR images assumes 3 DoF. The OMAF standard defines a user's PoV and field of view (FoV) by a yaw angle, a pitch angle, and a roll angle, assuming that the user is located at the center of a virtual sphere. A viewport is defined by the PoV and FoV.

On the other hand, it may be considered that the user is not located at the center of the sphere, and moves within the sphere. Herein, the position of the user within the sphere is represented as (x, y, z) coordinates determined according to a position to which the user has moved. The user motion information may include the (x, y, z) coordinates and the above-described yaw angle, pitch angle, and roll angle. As a VR image is changed according to the position of the user, the user may experience a vivid sense of presence and immersion.

A projection method and packing method may be determined according to the position, movement direction, and speed of the user, which are specified by user motion information.

Application of a position to which a user has moved, (x, y, z) along with the legacy 3 DoF is called 6 DoF.

FIGS. 11A, 11B, 11C, 11D, and 11E are diagrams illustrating various projection methods and packing methods.

Figure 11A:
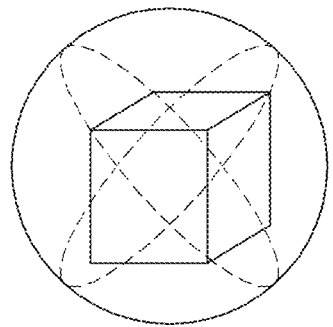
Figure 11A:
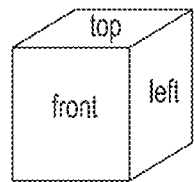
Figure 11A:
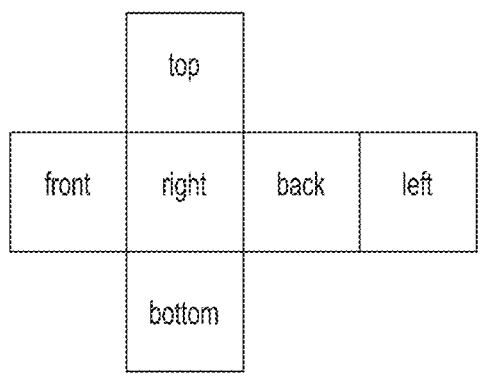

FIG. 11A illustrates cube projection and a packing method based on the cube projection, as a method for providing a 360-degree image.

If a user is located at the center of a sphere in view (a) in a VR image, a 360-degree image may be generated by cube projection in view (b) (hexahedron projection). While another projection method, equirectangular projection (ERP) has the drawback that distortion becomes severe toward the top (North Pole) part and the bottom (South Pole) part, in spite of less distortion at the middle (equator) part, cube projection offers the benefit of less distortion on each face because each face of the cube projection is generated in a similar manner.

FIG. 11B illustrates various cube projection-based packing methods.

Methods for packing a cube projection may include in view (a) a 4×3 packing method for packing a projected image by padding white space of a net of cube representing the projected image, in view (b) a 3×2 packing method in which two rows are configured by relocating each face so that each row includes three faces, and in view (c) a weighted packing method in which packed data is generated by scaling bottom the top, bottom, left side, right side, and back faces to ½, with the front face kept unchanged. The front, back, top, bottom, left side, and right side faces are called as they are, for the convenience of description, which should not be construed as limiting the scope of the present disclosure.

When a user views a 360-degree image (an omni-directional image) by a HMD device, an image on the front face may be more important. Accordingly, the data of the image on the front face may be increased. In this aspect, the weighted packing method illustrated in view (c) of FIG. 11B may be useful. However, since the resolution of each face is different, an image may be distorted at the boundary between any two faces in the weighted packing method.

To prevent distortion at the boundary between any two faces, a trapezoid packing method based on TSP projection may be used.

Figure 11C:
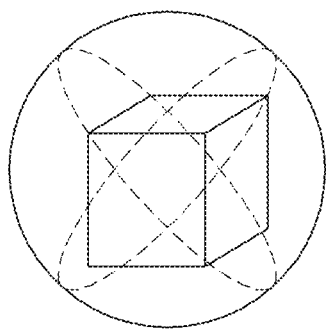
Figure 11C:
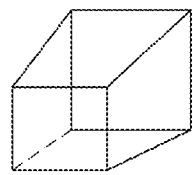
Figure 11C:
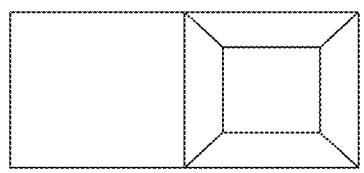
Figure 11D:
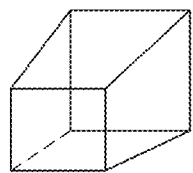
Figure 11D:
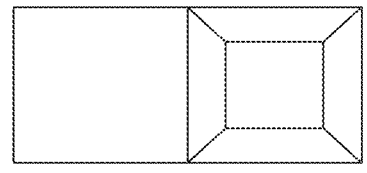
Figure 11D:
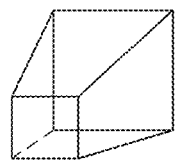
Figure 11D:
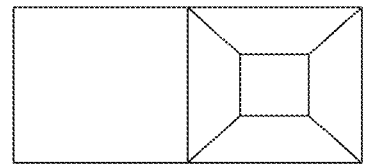
Figure 11D:
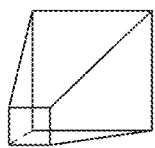
Figure 11D:
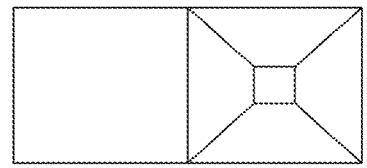
Figure 11D:
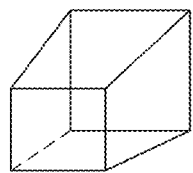
Figure 11D:
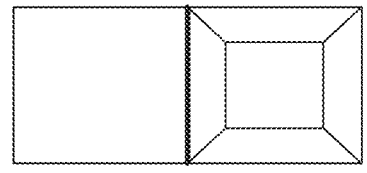

FIGS. 11C and 11D illustrates a TSP projection-based trapezoid packing method, according to an embodiment of the present disclosure.

The TSP projection may reduce the size of the back face, while maintaining the size of the front face. As illustrated in FIG. 11D, the size of the back face may be selective, and the back face may be a square or a rectangle.

In 3D platonic polyhedron projection (for example, cube projection), if information corresponding to each face of a platonic polyhedron is transmitted in the same size (for example, a square in the case of a cube), it may be considered that a region viewed by the user and a region not viewed by the user are processed with the same weight assigned to the regions. This implies that the same resources are allocated to regions with different degrees of importance, which is inefficient.

To allocate more information to a region viewed by a user, the present disclosure proposes a truncated pyramid packing method.

To use the truncated pyramid packing method, according to an embodiment, each face may be mapped to a trapezoid in 3D projection. For example, in the case of a cube, a rectangle-to-trapezoid mapping method may be used.

In cube projection, a region viewed by the user (for example, the front face) maintains the resolution of an original image, while the back face may be a square scaled-down at a predetermined ratio. On the other hand, the top, bottom, left side, and right side faces may be trapezoids. Packing may be performed by mapping a part of the square faces to a trapezoid, so that an image obtained by combining the top, bottom, left side, and right side faces may have the same resolution as that of the front face.

Views (a1), (b1), and (c1) of FIG. 11D illustrate TSP projection methods with a back face shaped into a square, and views (a2), (b2), and (c2) of FIG. 11D illustrate trapezoid packing methods corresponding to views (a1), (b1), and (c1) of FIG. 11D, respectively. The back face is larger in the order of views (a2), (b2), and (c2).

Further, view (d1) of FIG. 11D illustrates a TSP method with a back face shaped into a rectangle, and view (d2) of FIG. 11D illustrates a trapezoid packing method corresponding to view (d1) of FIG. 11D.

Figure 11E:
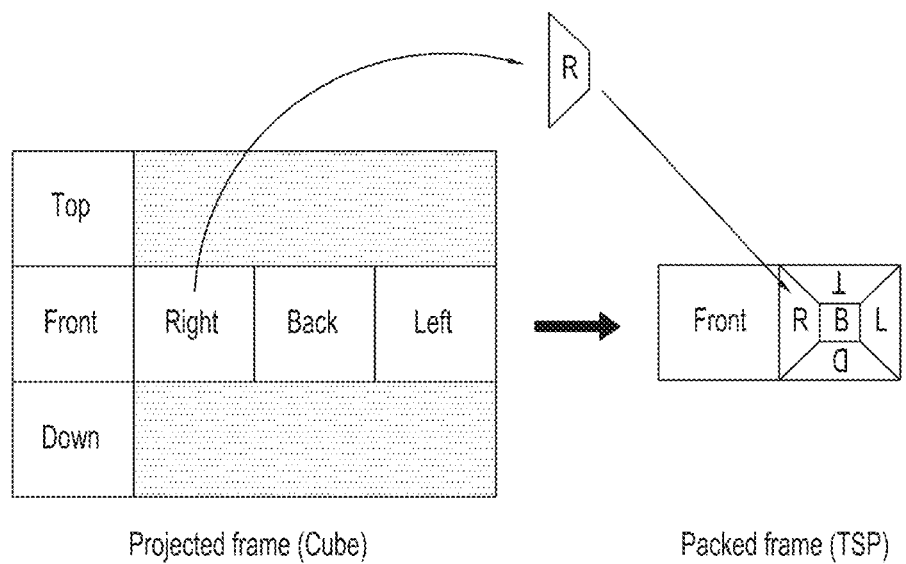

FIG. 11E illustrates a comparison between cube projection and TSP projection, according to an embodiment.

According to a TSP packing method, a cube projected frame may be converted to a TSP projected frame.

Referring to FIG. 11E, for example, the front face may be a square sampled at 1:1, the back face may be a square sampled at 1:9, and each of the right side, left side, top, and bottom faces may be an isosceles trapezoid sampled at 2:9.

The TSP packing method illustrated in FIG. 11E has the effect of reducing distortion at a boundary between any two faces.

Figure 12:
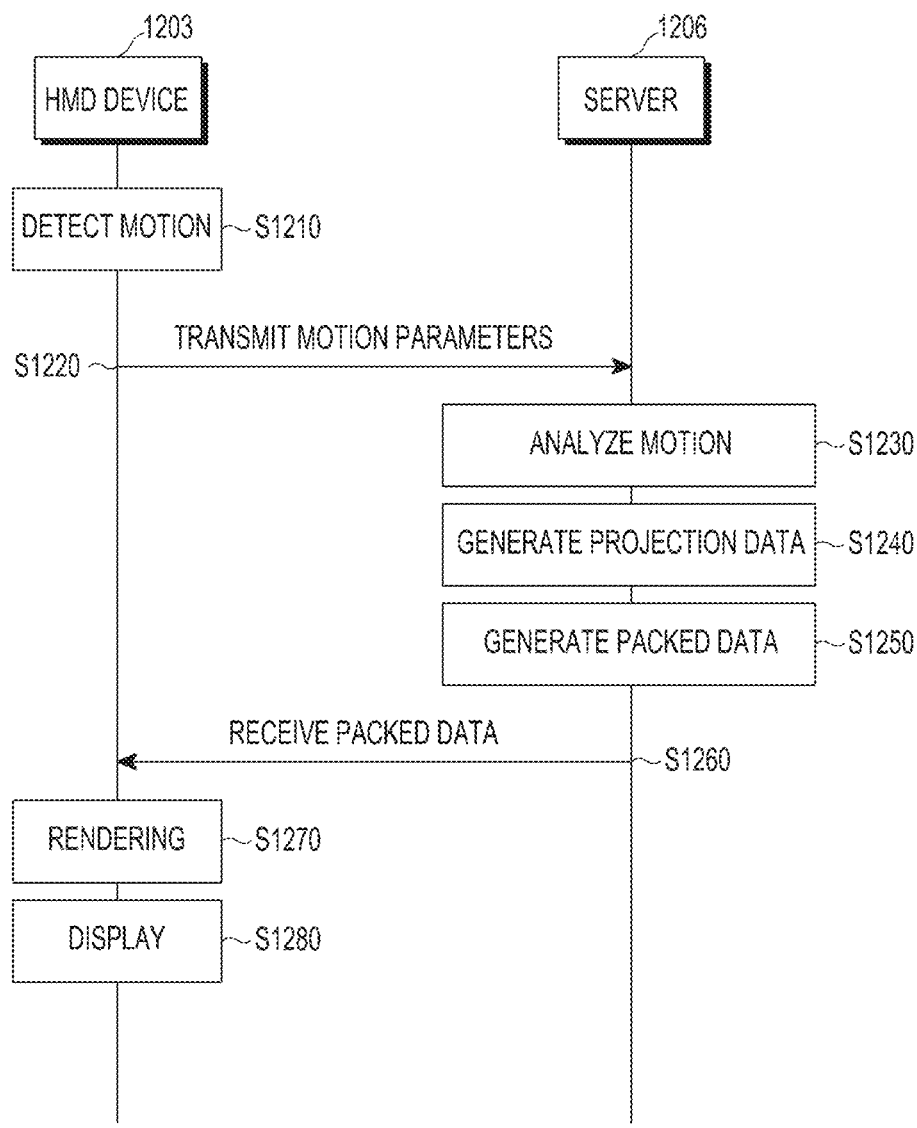
FIG. 12 is a flowchart illustrating a method and an apparatus for displaying an image based on motion information, according to an embodiment.

FIG. 12 is a flowchart illustrating a method for displaying an image based on motion information according to an embodiment.

An HMD device 1203 detects a user motion, in step S1210. Information about the detected user motion may include information about a distance d from the center of a sphere and a gaze direction of the user (the direction of from a user position to the PoV of the user), and may further include information about a user speed.

The HMD device 1203 generates motion parameters based on the user motion information, and transmits the generated motion parameters to an image distribution server 1206, in step S1220.

The image distribution server 1206 analyzes the motion based on the received motion parameters, in step S1230. The image distribution server 1206 generates a projected frame based on the analyzed motion, in step S1240, and generates packed data based on the generated projected frame, in step S1250.

The image distribution server 1206 transmits the generated packed data to the HMD device, in step S1260.

The HMD device 1203 generates a VR image by rendering the received packed data, in step S1270. The HMD device displays the VR image, in step S1280.

Figure 13:
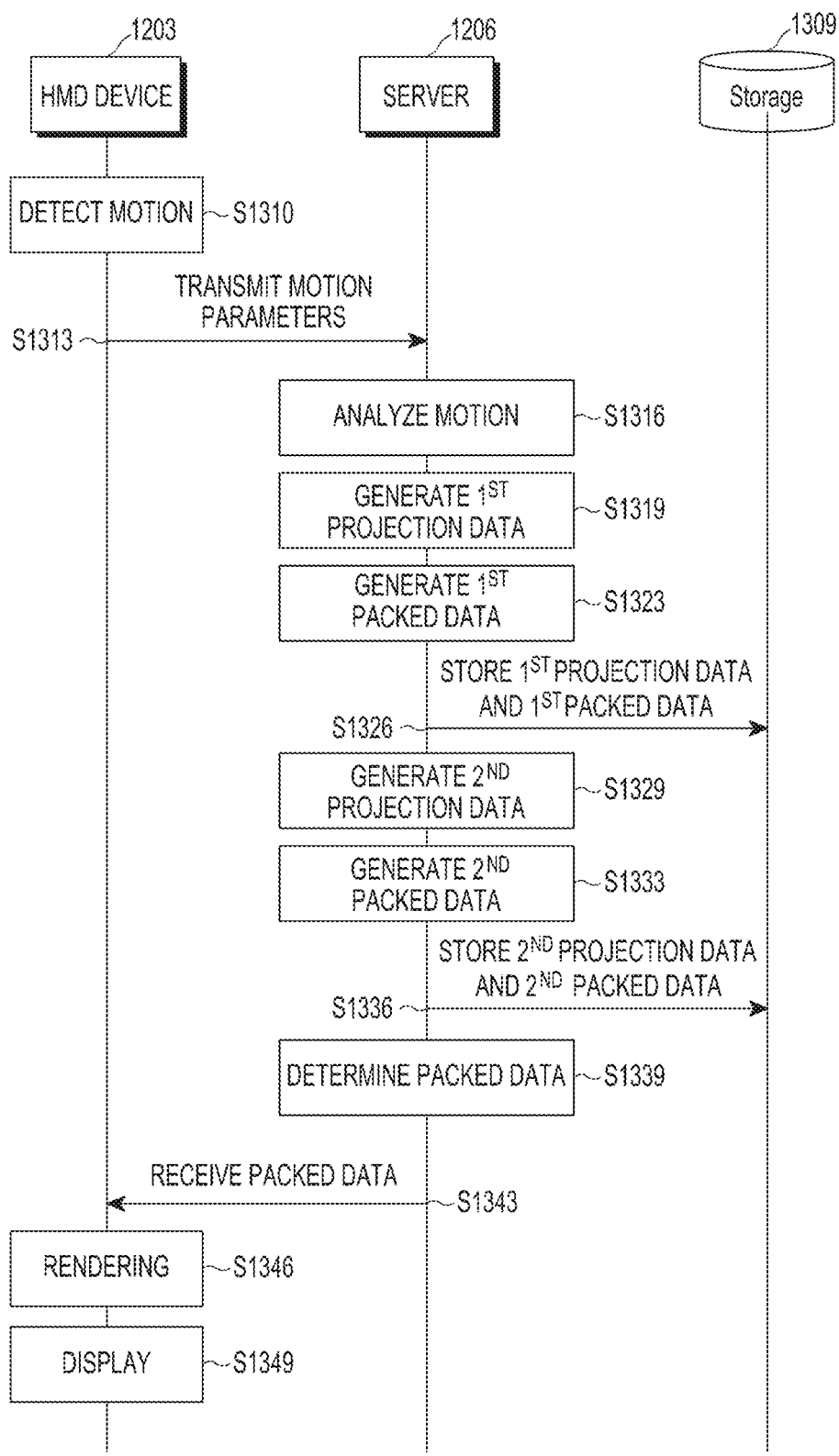
FIG. 13 is a flowchart illustrating a method and an apparatus for displaying an image based on motion information, according to another embodiment.

FIG. 13 is a flowchart illustrating a method and an apparatus for displaying an image based on motion information, according to another embodiment.

The HMD device 1203 detects a user motion, in step S1310. Information about the detected user motion may include information about a distance d from the center of a sphere and a gaze direction of the user, and may further include information about a user speed.

The HMD device 1203 generates motion parameters based on the user motion information, and transmits the generated motion parameters to the image distribution server 1206, in step S1313.

The image distribution server 1206 analyzes the motion based on the received motion parameters, in step S1316. The image distribution server 1206 generates a first projected frame based on the analyzed motion, in step S1319, and generates first packed data based on the generated first projected frame, in step S1323. Further, the image distribution server 1206 stores the first projection data and the first packed data in a storage, in step S1326.

In addition, second projection data and second packed data for the vicinity of a position corresponding to the first projection data and the first packed data are generated, in steps S1329 and S1333. The second projection data and the second packed data are stored in the storage, in step S1336. The storage may be a storage device included in the server or an independent storage device connected to the server. The type of the storage is not limited. Because the user generally moves to the vicinity of a current position, a service may be provided seamlessly using the second projection data and the second packed data for the vicinity. The image distribution server 1206 determines packed data to be transmitted to the HMD device 1203 based on the first packed data and the second packed data, in step S1339.

The image distribution server 1206 transmits the generated packed data to the HMD device, in step S1343.

The HMD device 1203 renders the received packed data, in step S1346, and displays the rendered VR image, in step S1349.

Figure 14:
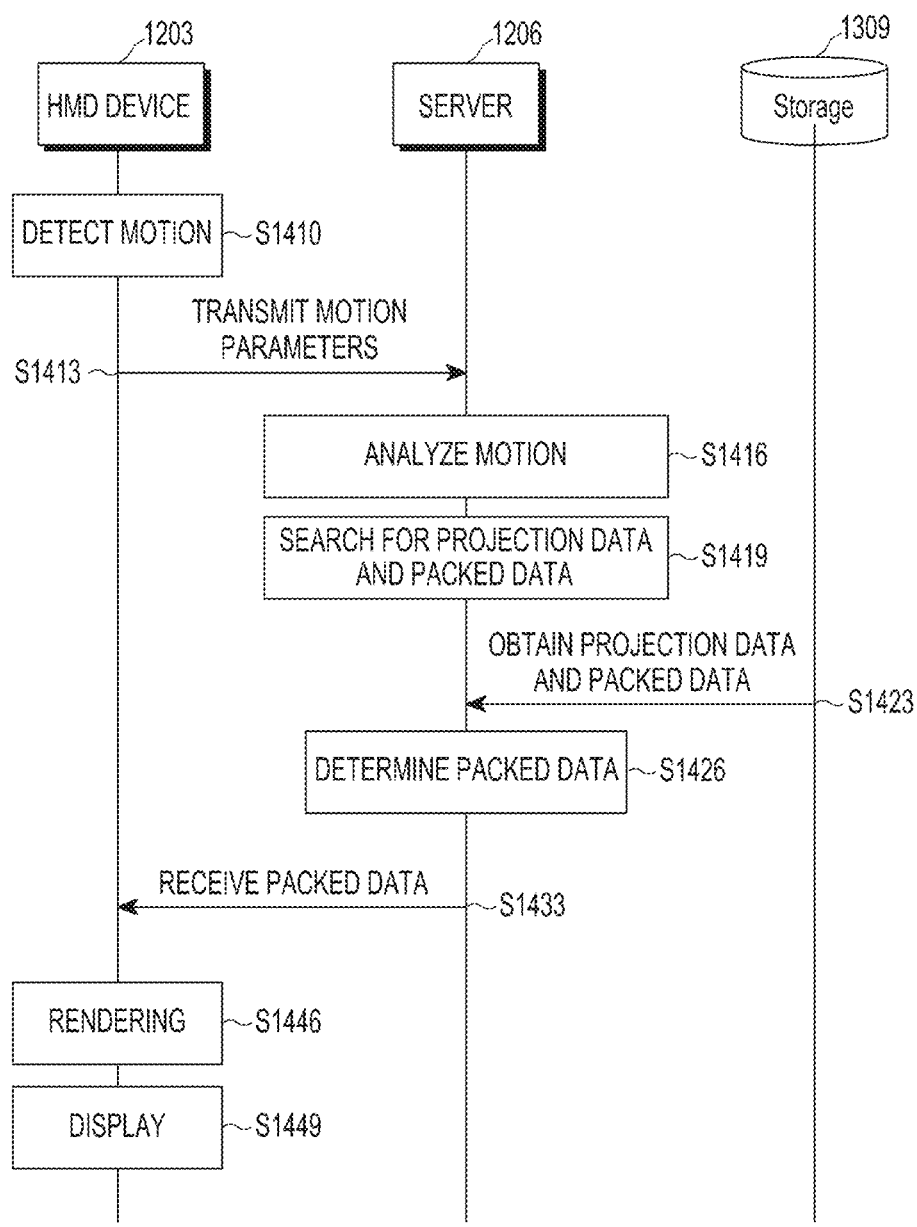
FIG. 14 is a flowchart illustrating a method and an apparatus for displaying an image based on motion information, according to another embodiment.

FIG. 14 is a flowchart illustrating a method and an apparatus for displaying an image based on motion information, according to another embodiment.

A projected frame and a packed frame may be searched for in the storage without the need for generating projection data (a projected frame) and packed data (a packed frame) each time as shown in FIG. 13. A time taken for projection and packing may be reduced by using a pre-stored projected frame and packed frame.

The HMD device 1203 detects a user motion, in step S1410, and transmits motion parameters generated based on the detected user motion to the image distribution server 1206, in step S1413. The image distribution server 1206 generates user motion information by analyzing the user motion based on the received motion parameters, in step S1416. The image distribution server 1206 searches for projection data and packed data based on the generation user motion information, in step S1419. The image distribution server 1206 obtains the projection data and the packed data from the storage, in step S1423 and determines packed data to be transmitted to the HMD device 1203, in step S1426. The HMD device 1203 receives the packed data from the image distribution server 1206, in step S1433, renders an image based on the received packed data, in step S1446, and displays the rendered image, in step S1449.

Figure 15:
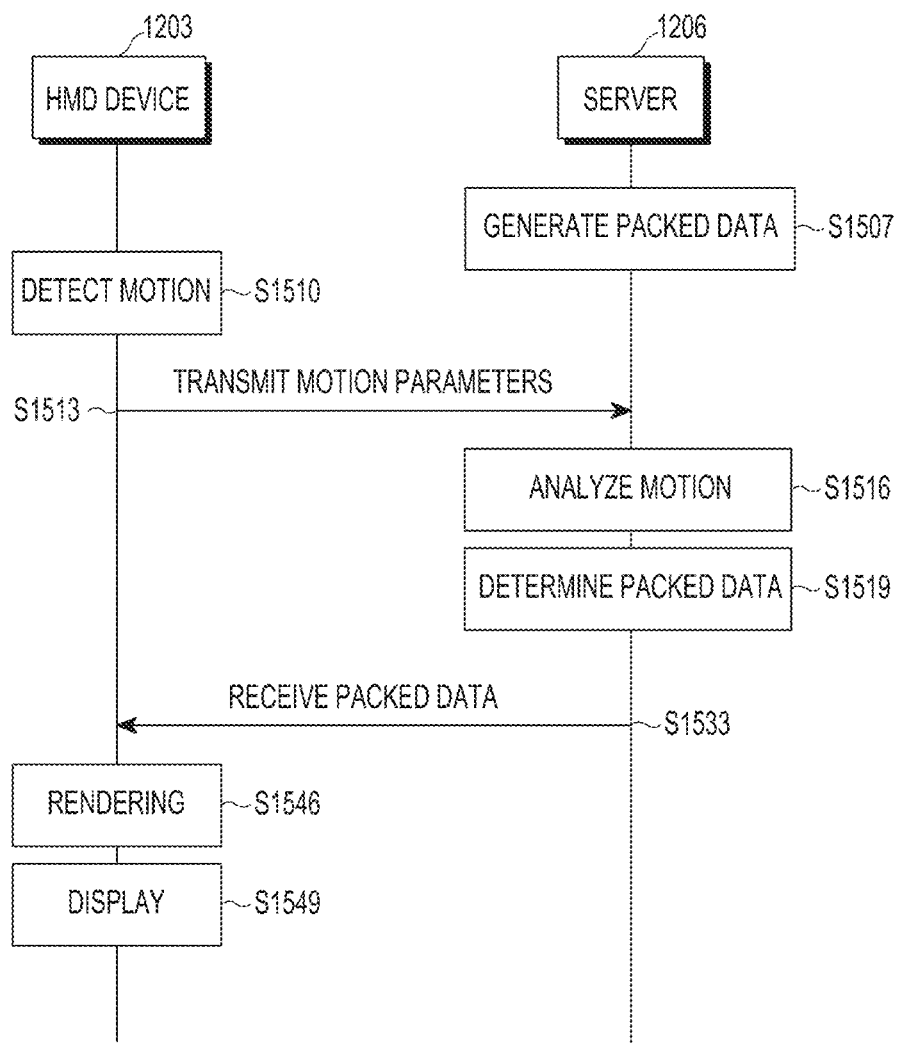
FIG. 15 is a flowchart illustrating a method and an apparatus for displaying an image based on motion information, according to another embodiment.

FIG. 15 is a flowchart illustrating a method and an apparatus for displaying an image based on motion information, according to another embodiment.

As described above, a server may pre-generate packed data, store the packed data in a storage, and select appropriate packed data from among the generated packed data based on analyzed user motion parameters.

The image distribution server 1206 pre-generates packed data, in step S1507. The HMD device 1203 detects a user motion, in step S1510, and transmits motion parameters generated based on the detected user motion to the image distribution server 1206, in step S1513. The image distribution server 1206 generates user motion information by analyzing the user motion based on the received motion parameters, in step S1516. The image distribution server 1206 determines packed data to be transmitted to the HMD device 1203 by searching for projection data and packed data in the generated packed data based on the generated user motion information, in step S1519. The HMD device 1203 receives the packed data from the image distribution server 1206, in step S1533, renders an image based on the received packed data, in step S1546, and displays the rendered image, in step S1549.

Figure 16:
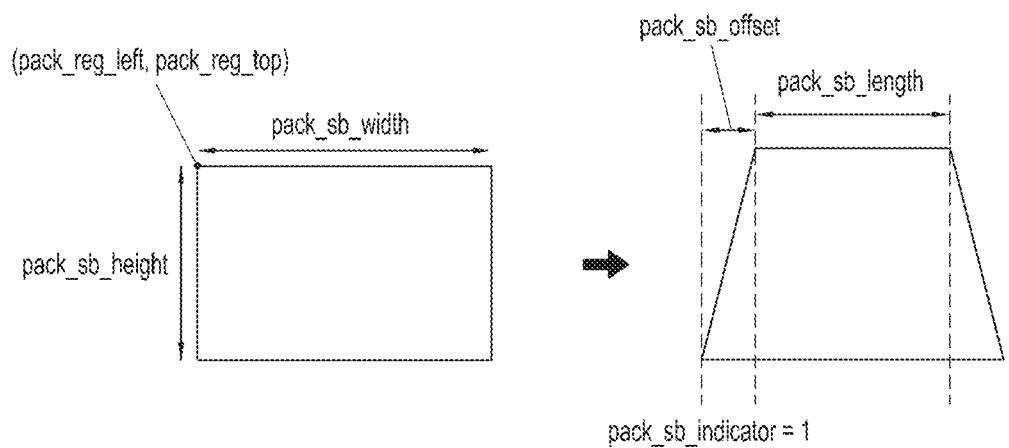
FIG. 16 is a diagram illustrating a trapezoid packing method, according to an embodiment.

FIG. 16 is a diagram illustrating a trapezoid packing method, according to an embodiment.

According to a projection method, each region of a projected frame may be a rectangle. One region of a packed frame corresponding to one of the regions of the projected frame may be a rectangle or a trapezoid. The position of the one region of the packed frame may be specified by pack_reg_left and pack_reg_top. Further, the size of the one region of the packed frame may be specified by pack_sb_width and pack_sb_height. If the one region of the packed frame is a square, pack_sb_width may be equal to pack_sb_height.

To pack a rectangle into a trapezoid, the longer base of the trapezoid is set to pack_sb_width, the start position of the shorter base of the trapezoid is set to pack_sb_offset, and the length of the shorter base of the trapezoid is pack_sb_length.

The height of the rectangle before the packing may be equal to the height of the packed trapezoid, and the rectangle may be scaled up or down at a predetermined ratio. The position of the shorter base of the trapezoid may be determined by pack_sb_indicator. If pack_sb_indicator is 1, this may imply that the shorter base of the trapezoid is the top side.

Figure 17:
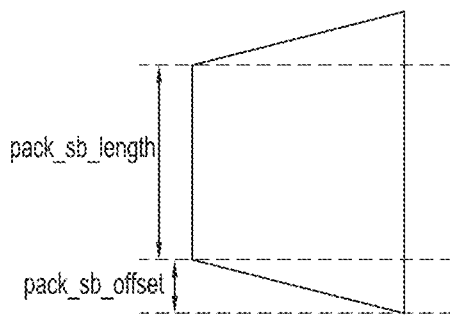
FIG. 17 is a diagram illustrating a trapezoid packing method, according to an embodiment.
Figure 17:
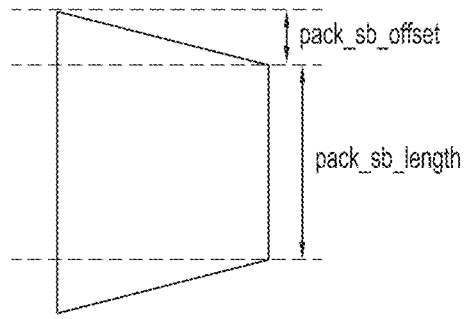

FIG. 17 is a diagram illustrating a trapezoid packing method, according to an embodiment.

FIG. 17 shows the position of the shorter base of a trapezoid according to the value of pack_sb_indicator in the trapezoid packing method. If pack_sb_indicator is 1, the shorter base of the trapezoid is the top side, if pack_sb_indicator is 2, the shorter base of the trapezoid is the bottom side, if pack_sb_indicator is 3, the shorter base of the trapezoid is the left side, and if pack_sb_indicator is 4, the shorter base of the trapezoid is the right side.

Figure 18A:
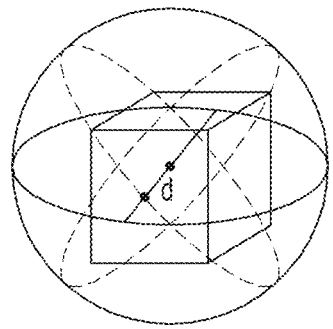
FIGS. 18A and 18B are diagrams illustrating a trapezoid packing method based on a user motion.
Figure 18A:
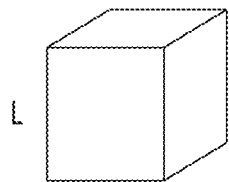
Figure 18A:
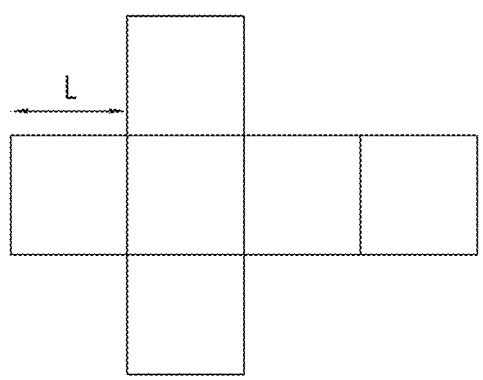
Figure 18B:
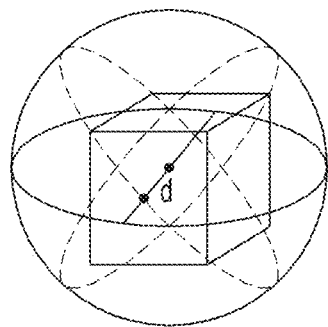
Figure 18B:
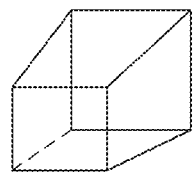
Figure 18B:
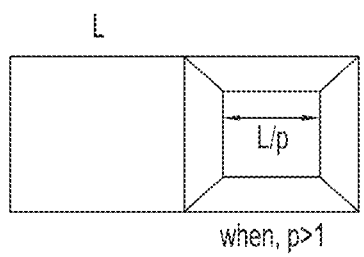

FIGS. 18A and 18B are diagrams illustrating a trapezoid packing method based on a user motion.

Cube projection (cube packing) may pack the regions of a projected image by changing only the positions of the regions without conversion of each region itself. If the length of one side of a cube is L, the length of one side of each packed face (a square) is also L. Thus, in the case of 4:3 packing, the cube may be packed into a rectangle with a width of 4L and a length of 3L. In the case of 3:2 packing, the cube may be packed into a rectangle with a width of 3L and a length of 2L. In FIG. 18A, packed data in the regions of the packed frame may have the same size irrespective of a user motion.

FIG. 18B is a diagram illustrating a TSP projection method and a trapezoid packing method according to a movement distance d, when a user has moved from the center of a sphere by the distance d in a spherical model.

According to an embodiment, if a user has moved from the center of a sphere by a distance d, p (p>1) is determined according to the distance d. The trapezoid packing method generally decreases the size and resolution of an image of the back face with the shape of the back face maintained, while maintaining an image of the front face in the size, shape, and resolution of an original image. The size of transmission and reception data may be reduced by reducing the size of the data of the image of the back face which is not relatively important. On the other hand, the right side, left side, top, and bottom faces may be trapezoids, and may be determined according to the sizes of the top and bottom faces. As described before, the terms, front face, back face, top face, bottom face, right side face, and left side face are used for the convenience of description, which should not be construed as limiting the present disclosure.

Further, the back face may be a rectangle, not a square. If the back face is a rectangle, views (d1) and (d2) of FIG. 11D may be referred to.

As described above, the size and resolution of the front face are not always largest. For example, when a user views a VR image with a HMD device, the user may move backward. Even though the user moves backward, the user may still pay more attention to an image on the front face. In this case, the resolution of the front face may be higher than that of the back face. However, when the user moves backward, the user may view ahead temporarily, and may abruptly turn around (turn back) and proceed. In this case, since the back face may be more important than the front face, the resolution of the back face may be higher than that of the front face.

The positions of the front, back, left side, right side, top, and bottom faces are not fixed. In the present disclosure, the face of a cube in a direction in which a user gazes may be referred to as the front face, the face opposite to the front face may be referred to as the back face, and the top, bottom, left side, and right side faces may be determined based on the front face which the user views.

In a method for displaying an image, according to another embodiment, projection data for the front, back, left side, right side, top, and bottom faces are generated by cube projection based on a distance for which and a direction in which a user has moved from the center of a sphere in a spherical model. The generated projection data is converted into packed data according to a ratio p determined based on the distance d.

The gaze direction and movement direction of the user are different. However, since the user generally tends to move in the direction in which the user views, the gaze direction and movement direction of the user may be similar. Assuming that the movement direction of the user is the PoV of the user, the front face exists in the movement direction, and the back face exists opposite to the front face, a magnification p may be calculated according to the movement distance d. A TSP projection method and a trapezoid packing method may be applied by using the calculated p. A case in which the gaze direction and movement direction of a user are different is described in greater detail below with reference to FIG. 25.

To generate projection data at a specific position in a 6 DoF image, first projection data may be pre-generated in the form of a cube at a plurality of positions inside a sphere in a sphere model. The pre-generated first projection data may be generated irrespective of the gaze of the user, and in the 3×2 packing method illustrated in view (b) of FIG. 11B. The gaze of a user using a VR device is determined by a direction in which the user views, and the gaze direction of the user changes during viewing VR images. Thus, when the first projection data is pre-generated, the gaze of the user may not be considered. The first projection data is generated by treating the six faces equally in cube projection. A coordinate system used for pre-generation of the first projection data may be referred to as a global coordinate system, and a coordinate system generated based on the gaze of the user may be referred to as a local coordinate system.

If the user moves to a specific position, second projection data corresponding to the moved position of the user may be generated using a plurality of pre-generated first projection data corresponding to the vicinity of the specific position. The second projection data corresponding to the moved position of the user may be converted into third projection data according to the gaze of the user. The use of cube projection facilitates conversion of projection data according to the gaze of the user.

Figure 19:
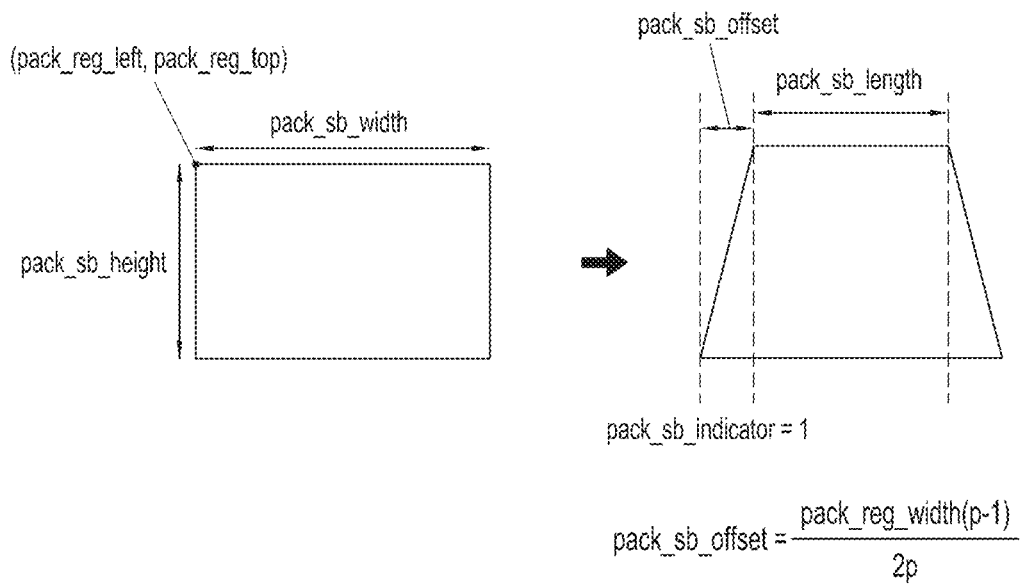
FIG. 19 is a diagram illustrating a trapezoid packing method based on user motion information.

FIG. 19 is a diagram illustrating a trapezoid packing method based on user motion information.

In TSP projection-based trapezoid packing, p (p>1) may be calculated based on a distance moved by a user. The size of the back face relative to the size of the front face may be determined by p. Herein, the trapezoid may be an isosceles trapezoid.

The length of the shorter base of the trapezoid, pack_sb_length may be determined to be pack_reg_width/p using Equation (1) below:

$$\text{pack\_sb\_lengt} = \frac{\text{pack\_reg\_width}}{p} \quad (1)$$

If the trapezoid of a packed region is an isosceles trapezoid, the length of one side of the back face, L/p is determined by p. Since the isosceles trapezoid is horizontally symmetrical, pack_sb_offset for trapezoid packing may be determined using Equation (2) below:

$$\text{pack\_reg\_width} = \frac{\text{pack\_reg\_width}}{p} + 2 * \text{pack\_sb\_offset} \quad (2)$$

$$\text{pack\_sb\_offset} = \text{pack\_reg\_width} * \frac{(p-1)}{2p}$$

Figure 20:
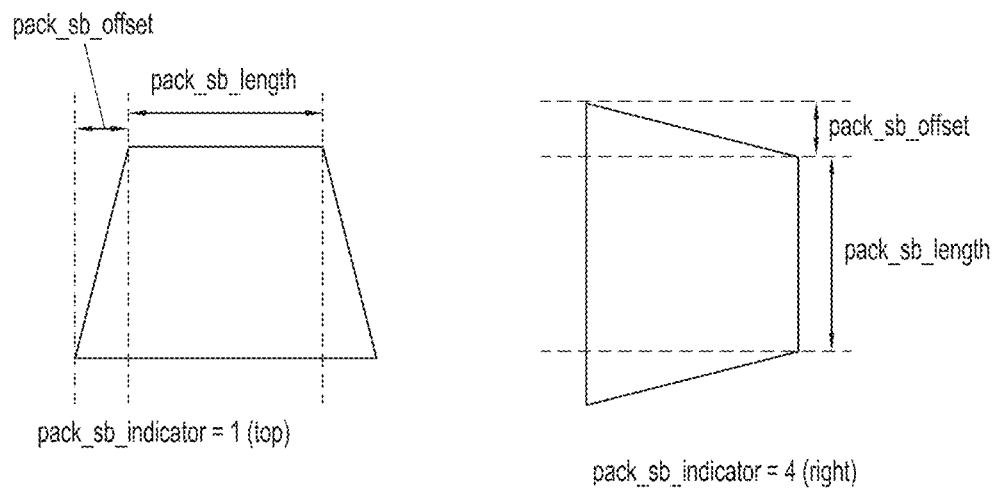
FIG. 20 is an exemplary view illustrating rotation of a packed trapezoid, according to an embodiment.

FIG. 20 is a diagram illustrating a rotation of a packed trapezoid, according to an embodiment.

As described above, a rotation of a trapezoid may be represented by pack_sb_indicator.

Figure 21:
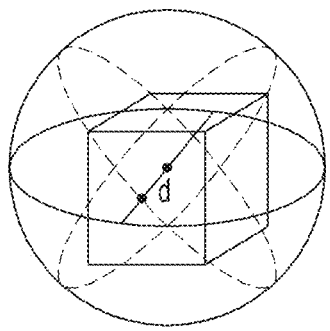
FIG. 21 is a diagram illustrating a trapezoid packing method based on user motion information, according to another embodiment.
Figure 21:
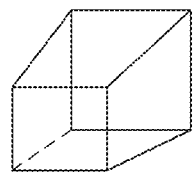
Figure 21:
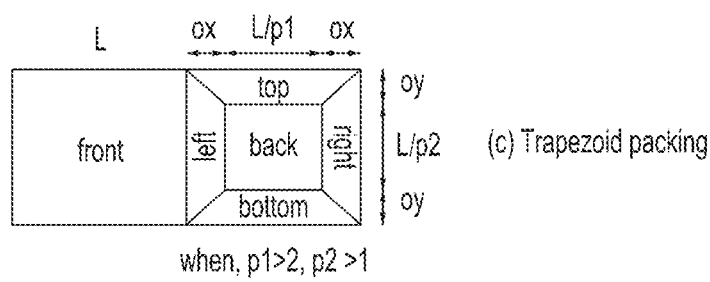

FIG. 21 is a diagram illustrating a trapezoid packing method, according to another embodiment.

In the trapezoid packing method according to an embodiment, the back face may be a rectangle, not a square.

p1 and p2 may be determined based on a distance d, moved by the user.

pack_sb_offset is determined by ox and oy in FIG. 21. The values of ox and oy may be obtained in a similar manner to Equation (1). The values of pack_sb_indicator are listed in Table 8 below. Referring to view (c) of FIG. 21, ox represents pack_sb_offset for the top and bottom faces, and oy represents pack_sb_offset for the left and right side faces.

Once p1 and p2 are determined by the distance d, moved by the user, ox and oy may be calculated by Equation (1) and Equation (2).

Table 8 lists the values of pack_sb_indicator for the top, bottom, left side, and right side faces in the trapezoid packing method illustrated in view (c) of FIG. 21.

pack_sb_indicator specifies the position of the shorter base of the trapezoid.

TABLE 8

| | pack_sb_indicator |
|---|---|
| top | 2 |
| bottom | 1 |
| left | 3 |
| right | 4 |

For 3 DoF, it is assumed that a user is located at the center of a virtual spherical screen. For 6 DoF, it is assumed that a user moves, rather than being located at the center of a sphere.

If a distance moved from the center of a sphere by a user is d, a magnification larger than 1, p may be determined according to the distance d. The length of one side of the front face (square) of an original image is denoted by L. Then, the length of a side of the back face being a square may be determined to be L/p. Further, magnifications p1 and p2 each larger than 1 may be determined according to the distance d so that the back face may have different width and height, and the width and height of the back face may be determined to be L/p1 and L/p2, respectively. The length of a side of the back face may be determined, and the trapezoidal shapes of the top, bottom, left side, and right side faces may be determined. The trapezoids may be isosceles trapezoids or right-angled trapezoids. The top, bottom, left side, and right side faces may have different trapezoidal shapes according to the position and shape of the back face, which is exemplary, not limiting the scope of the present disclosure.

For example, each face is mapped to obtain packed data. In regard to the mapped face for each face, if the top, bottom, left side, and right side faces are shaped into the same trapezoid, the back face may be a square. If the top and bottom faces have the same shape, the left side and right side faces have the same shape, and the top and left side faces have different shapes, the back face may be a rectangle.

Referring again to FIG. 21, the position of the back face may be determined by ox and oy. The trapezoidal shapes of the top, bottom, left side, and right side faces may be determined by determining the position and shape of the back face and connecting each vertex of the back face to a point of a square having the same size as that of the front face, corresponding to the vertex. For the purpose of packing efficiency, it is assumed that each side of the back face is parallel to a side of a square of the same size as that of the front face, corresponding to the side of the back face. Thus, the number of parameters required for packing may be reduced. If the centers of the back face and the front face are the same and the back face is a square, the sizes and shapes of all faces may be determined only by the magnification p without using additional parameters.

The magnification p, or the magnifications p1 and p2, may be determined according to the speed of the user, aside from the position of the user. Further, the magnification p, or the magnifications p1 and p2, may be determined according to the position and speed of the user.

A server for packing an image based on a user motion, according to the present disclosure may predict a next motion from VR image data, select a packing method to be applied to the image, and pre-generate packed data.

An HMD device may detect the position and speed of the user, and transmit the detected information to the server. The server may transmit the pre-generated packed data to the HMD device, or generate new packed data corresponding to the detected information and transmit the new packed data to the HMD device.

The generated packed data may be stored in a database, for later use as packed data to be transmitted in response to a user request.

The HMD device may detect a user motion. The user motion may include a movement distance, a movement direction, and a speed.

Motion parameters may be obtained based on the detected user motion. The motion parameters may be transmitted to the server.

The server may determine whether the user has moved in the same section by analyzing the motion parameters.

Figure 22:
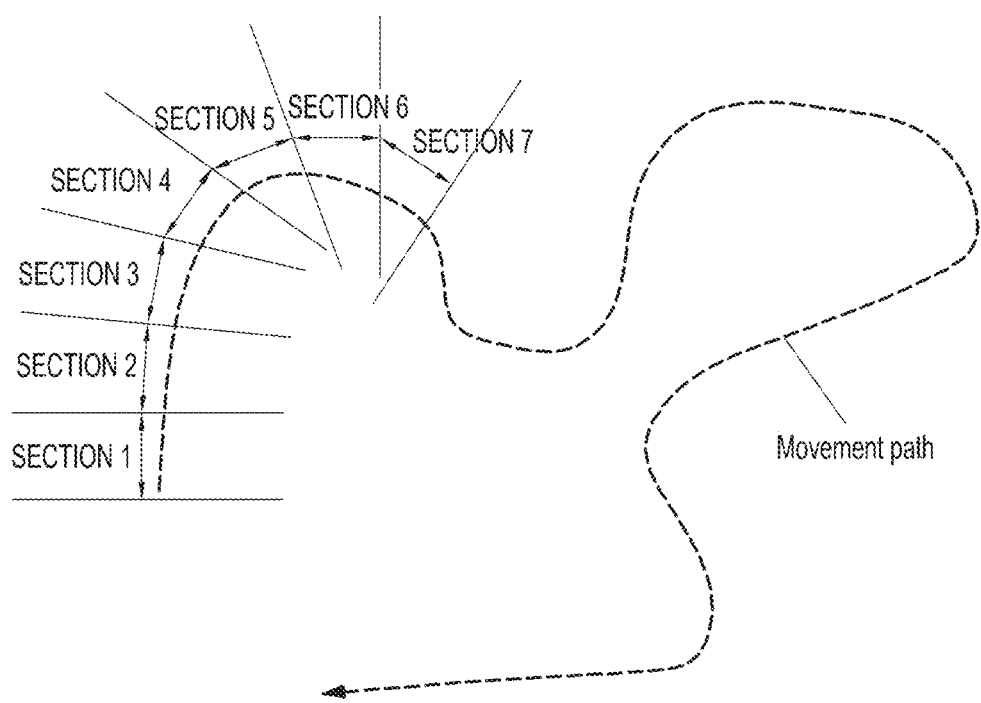
FIG. 22 is a diagram illustrating a trapezoid packing method based on user motion information, according to an embodiment.

FIG. 22 is a diagram illustrating a trapezoid packing method based on user motion information, according to an embodiment.

In FIG. 22, a path in which a user has moved is shown as separate sections. Since projection data and packed data may not be generated for all positions on the movement path of the user, projection data and packed data may be generated for a specific section.

The VR device of the user may detect a user motion and transmit information about the user motion to the server. The server may determine whether a next VR image requested by the user is for the same section as the current VR image by analyzing the user motion. In the case of the same section, the server may generate a packing candidate group with a high movement possibility, whereas in the case of different sections, the server may generate new packed data.

For example, the user moves at similar speeds in similar directions in section 1, section 2, and section 3 in FIG. 22. Thus, the same projection method and the same packed data may be used for section 1, section 2, and section 3. On the contrary, the speed and direction of the user in section 4 are different from those in section 1, section 2, and section 3, and thus, a different packing method may be used for section 4.

Figure 23:
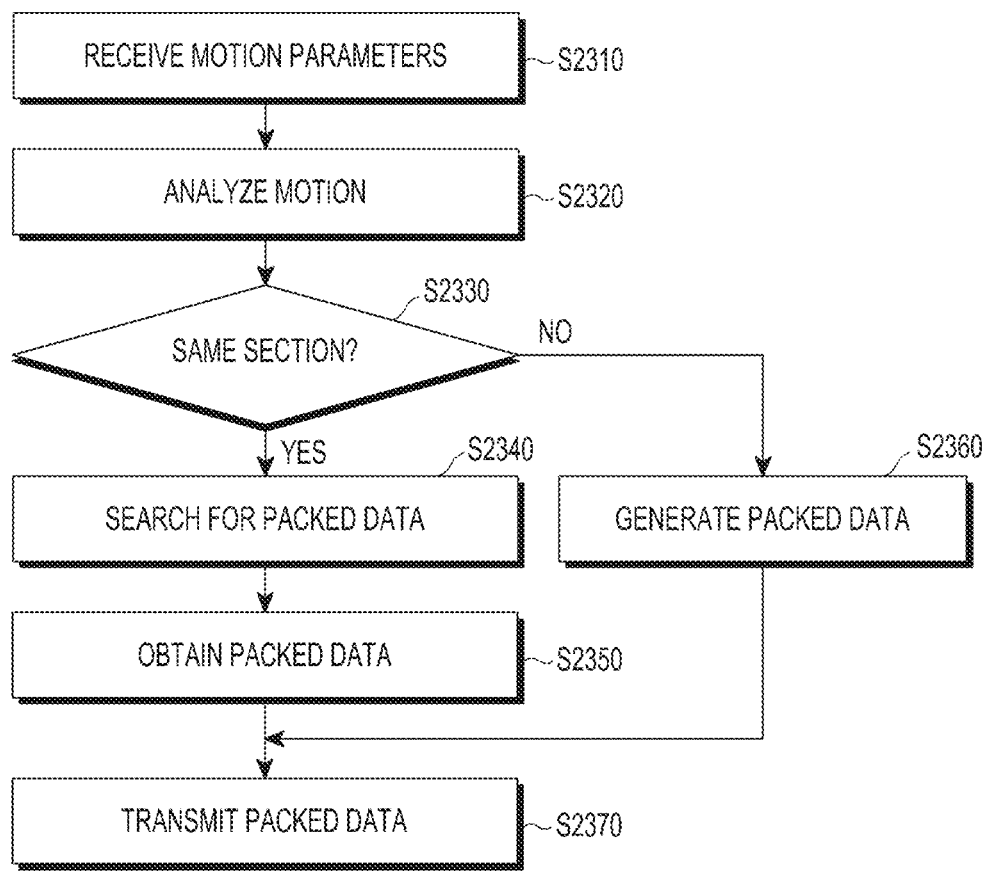
FIG. 23 is a flowchart illustrating a section-wise packing method in an image distribution server, according to an embodiment.

FIG. 23 is a flowchart illustrating a section-wise packing method in an image distribution server, according to an embodiment.

The image distribution server receives motion parameters from an HMD device, in step S2310, and analyzes a user motion based on the received motion parameters, in step S2320. In step S2330, it is determined whether a user has moved in a same section. If a user has moved in the same section, the image distribution server searches pre-generated packed data, in step S2340, and obtains packed data, in step S2350. The image distribution server transmits the obtained packed data to the HMD device, in step S2370.

If the user has moved in a different section, the image distribution server generates packed data according to the user motion, in step S2360, and transmits the generated packed data to the HMD device, in step S2370.

Figure 24:
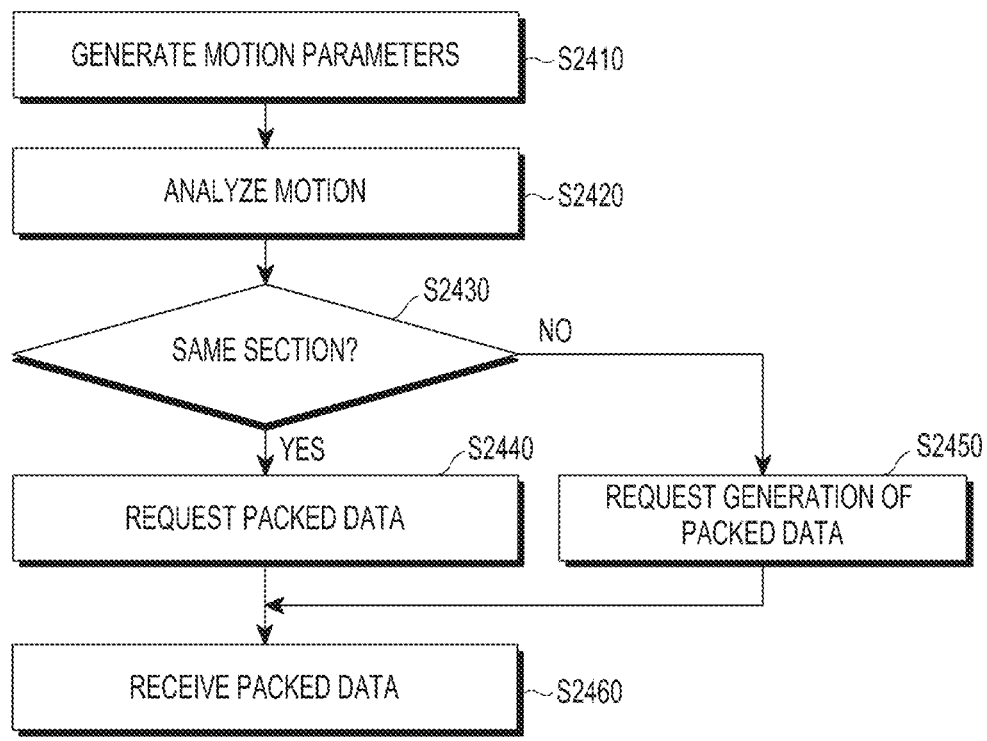
FIG. 24 is a flowchart illustrating a method for acquiring section-wise packed data in an HMD device, according to an embodiment.

FIG. 24 is a flowchart illustrating a method for acquiring packed data per section in a HMD device, according to an embodiment.

The HMD device generates motion parameters by sensing a user motion, in step S2410. The HMD device analyzes the user motion based on the generated motion parameters, in step S2420. In step S2430, it is determined whether a user has moved in a same section. If the user has moved in the same section, the HMD device requests packed data to an image distribution server, in step S2440. If the user has moved in a different section, the HMD device requests the image distribution server to generate packed data according to the user motion, in step S2450. The HMD device receives the packed data from the image distribution server, in step S2460.

Figure 25:
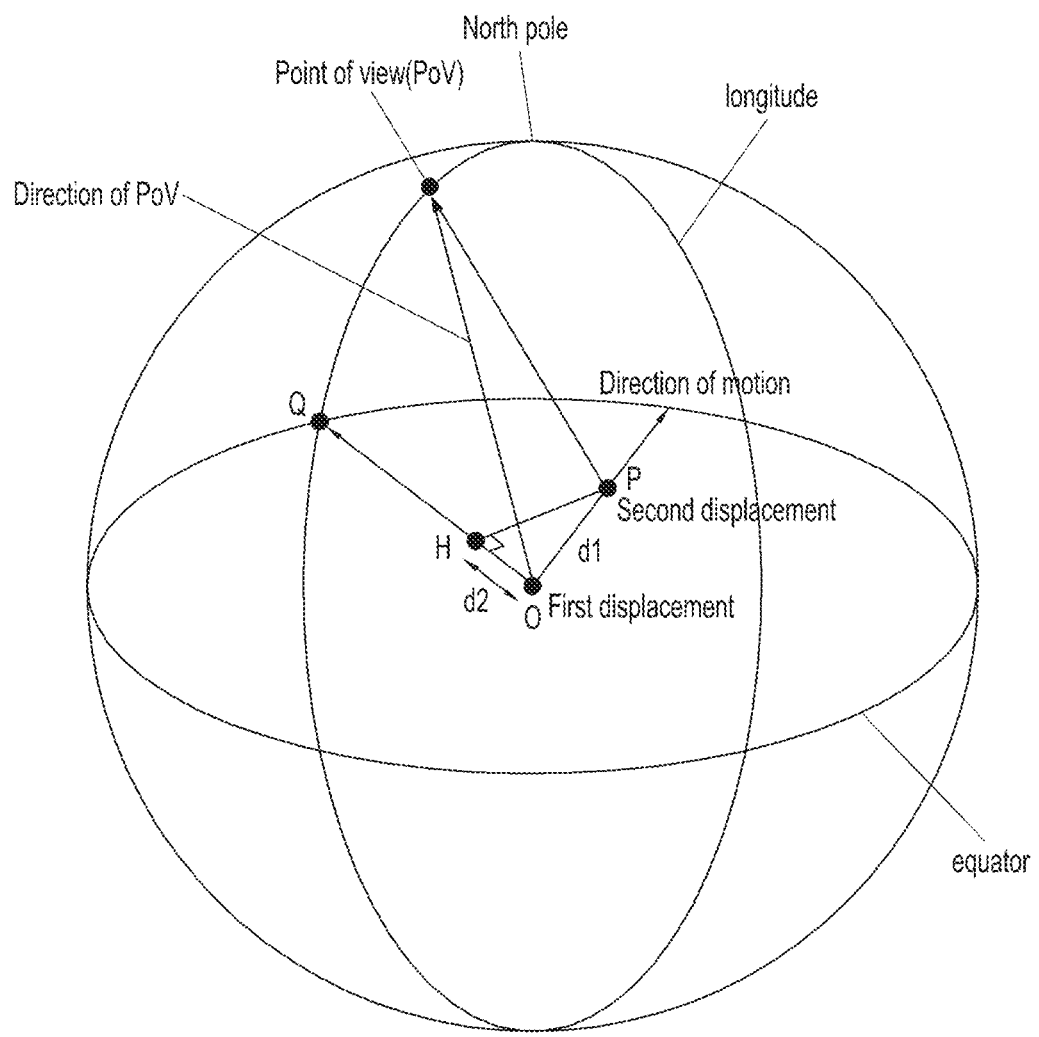
FIG. 25 is a diagram illustrating a method for obtaining a user movement distance, d2, according to an embodiment.

FIG. 25 is a diagram illustrating a method for calculating a distance moved by a user, d2, according to another embodiment.

The user moves from a first displacement, point O, to a second displacement, point P, and the direction of motion of the user may be different from the gaze direction of the user at the moved position.

If a spherical image is based on the assumption of a virtual distance (spherical radius) r from the center of a sphere in a spherical model, a movement distance of the user, d1, may be less than r.

Once the gaze of the user at the second displacement is determined, the PoV of the user is determined. Since the PoV is determined by a yaw angle and a pitch angle from the center of the sphere, the position of the PoV is specified by the yaw angle and pitch angle. A longitude including the PoV may be obtained, and a point (point Q) at which the PoV meets the equator may be obtained. This is specified by the yaw angle of the PoV.

The foot of perpendicular (point H) from point P to line OQ may be obtained. Herein, packed data may be generated by using line OH (d2) as the movement distance of the user, d. 6 DoF packed data may be generated in consideration of both the PoV and position of the user.

A method and an apparatus for displaying an image, according to an embodiment, may add a special effect based on a user motion. For example, if a user moves forward, the effect of the user's forward movement may be achieved by moving a virtual object along a trace from a forward direction to a backward direction in packed data for the left side and right side faces. Packed data may be generated by adding a visual effect according to a movement direction and speed.

Further, in the presence of a vertically falling object from above, such as a rain drop, the trace of the object may be changed to be at a predetermined angle according to a movement direction.

Further, augmented reality (AR) may be provided by adding sound effects, such as, for example, wind sounds or sounds generated by movement, according to a movement speed.

Based on the above-described visual effect and sound effect, the server may pre-generate VR image data for various environments by estimating user motions. As the server transmits pre-generated data to the user, the server may provide a service fast.

Figure 26:
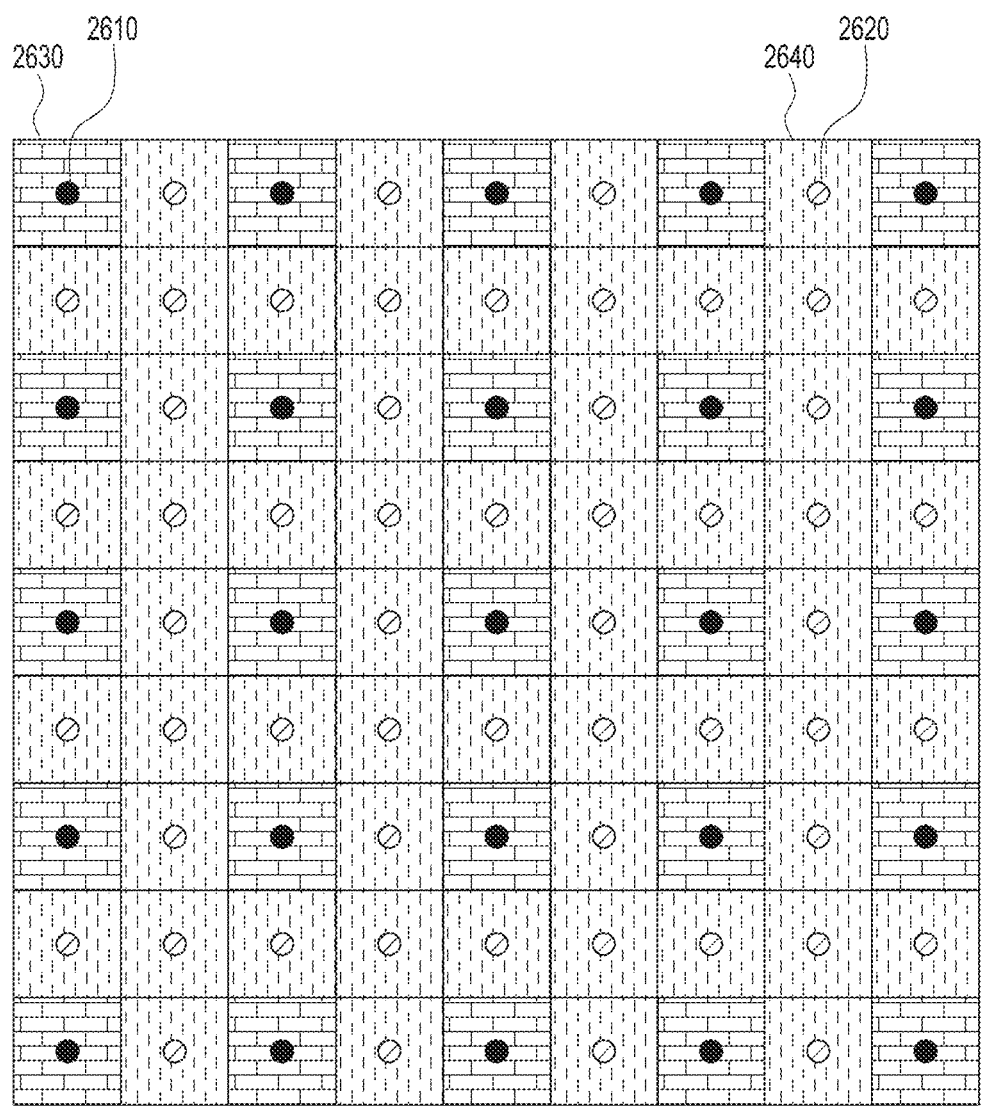
FIG. 26 is a diagram illustrating a method and an apparatus for displaying a 360-degree image, according to an embodiment.

FIG. 26 is a diagram illustrating a method and apparatus for displaying a 360-degree image, according to an embodiment.

To generate a 360-degree image, images captured by an omni-directional camera (a 360-degree camera, a panorama camera, or the like) are used.

For example, a 360-degree image may be captured by installing omni-directional cameras at positions 2610 of black spots in FIG. 26. In FIG. 26, there are a total of 25 black spots 2610, and a 360-degree image may be obtained at each position, using the 25 omni-directional cameras. The number of omni-directional cameras is exemplary, not limiting the scope of the present disclosure. Since video production cost increases with the number of omni-directional cameras, the number of omni-directional cameras may be determined reasonably. However, to play back precise and natural images, the number of required per-position omni-directional images may be larger than the number of images captured by the omni-directional cameras. The number of omni-directional cameras may not be increased infinitely due to cost constraints. To obtain omni-directional images according to a user position, omni-directional images for non-capturing positions 2620 may be synthesized based on images captured by the omni-directional cameras. Various techniques of generating omni-directional images at middle points by using a plurality of current omni-directional images are disclosed.

In FIG. 26, a total of 56 patterned spots existing between the 25 black spots represent positions at which additional omni-directional images are synthesized based on omni-directional images generated by adjacent omni-directional cameras.

In FIG. 26, 56 additional omni-directional images may be generated using 25 omni-directional images. Numerals described in FIG. 26 are exemplary, not limiting the scope of the present disclosure.

Referring to FIG. 26, images captured by the omni-directional cameras at the capturing positions 2610 may be used for regions 2630, and images which have not been captured by actual omni-directional cameras but have been generated based on images captured in the vicinity, for the non-capturing positions 2620 may be used for regions 2640.

Figure 27:
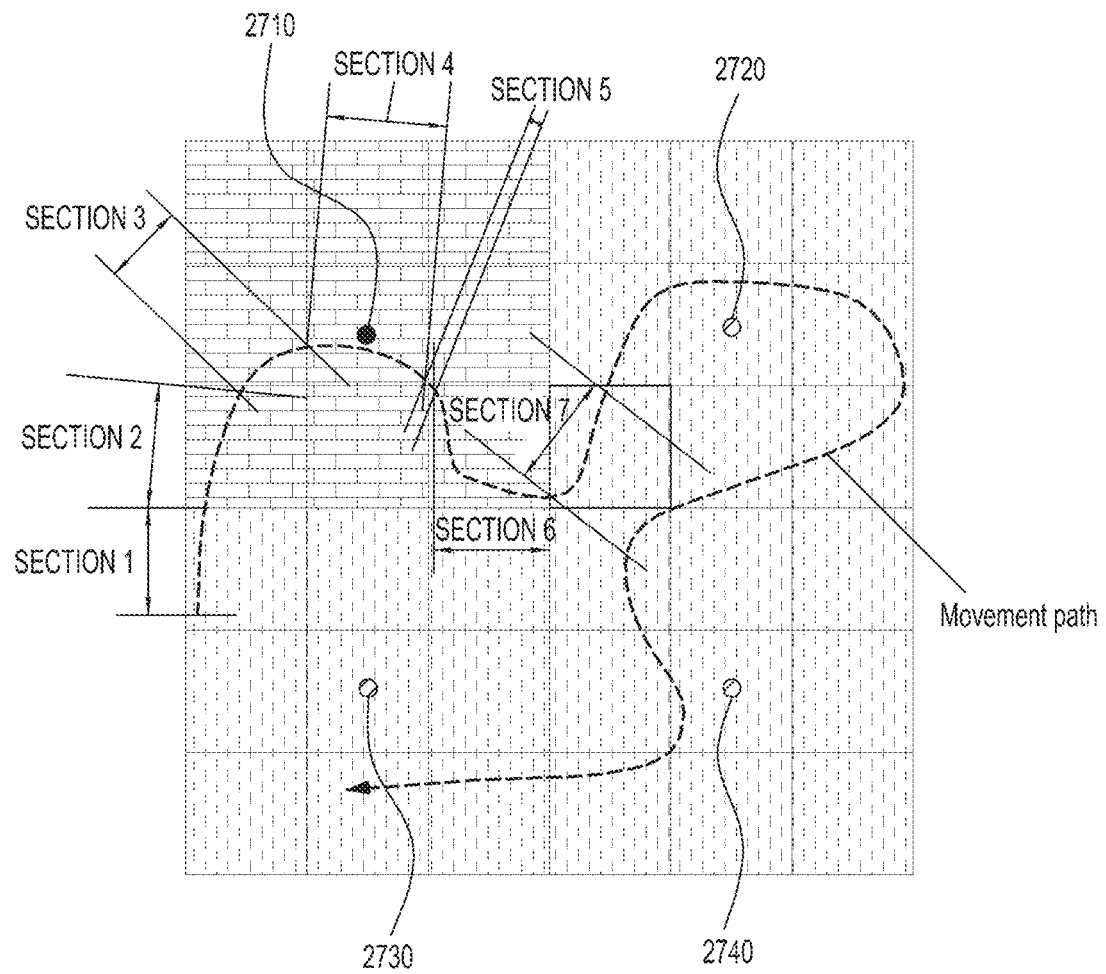
FIG. 27 is a diagram illustrating a method and an apparatus for displaying a 360-degree image, according to another embodiment.

FIG. 27 is a diagram illustrating a method and an apparatus for displaying a 360-degree image, according to another embodiment.

FIG. 27 is an enlarged view of a part of FIG. 26. A black spot 2710 represents a position at which an actual omni-directional camera captures an image, and patterned spots 2720, 2730, and 2740 represent positions at which additional omni-directional images are virtually captured by synthesis of omni-directional images captured by adjacent omni-directional cameras. Further, a user movement path is shown in FIG. 27.

Each position 2710, 2720, 2730, or 2740 corresponds to one of four regions divided from a total region displayed in FIG. 27. For each region, projection data generated by an omni-directional image (a first omni-directional image) captured by an actual camera or a virtual omni-directional image (a second omni-directional image) generated based on the actual captured omni-directional image may be used.

The four regions divided from the total region illustrated in FIG. 27 may further be divided. In FIG. 27, each region is divided into 9 sub-regions. Although the 9 sub-regions of each region use the same omni-directional image, a different packing method may be used for each of the sub-regions.

In FIG. 27, a dotted line represents the user movement path. The user movement path may be divided into sections based on the sub-regions. Packed data may be generated for each section, using the same packing method. That is, according to a part of the movement path of the user, specific section to which the same packing methods are applied, may be determined.

As is apparent from the foregoing description, according to embodiments, content generated at a user position may be displayed naturally by detecting a user motion.

According to the embodiments, since packed data for VR image rendering optimized for a user motion may be selected by analyzing user motion information, a higher sense of immersion may be provided to a user. A transform part for which only eight modes are available in a conventional packing method is divided into a flip part and a rotation part, thereby increasing the degree of freedom. Further, the accuracy of rotation in units of 90 degrees is changed to the accuracy of rotation in units of 45 degrees, thereby increasing the compression efficiency of octahedron packing which has not been handled conventionally.

A projected 360-degree image may be packed, and a VR image may be represented based on the packed data. A VR device may display an image through a predetermined packing model irrespective of a user motion, by use of various projection models and packing models. Further, an optimal projection model and packing model may be generated according to a user motion, and the VR device may estimate the user motion, generate a packing model optimized for the motion, and then display an image.

According to the embodiments, since a motion of a VR user is estimated, and then an optimal packing model corresponding to the estimated motion is selected and retransmitted to the VR user, a sense of immersion may be increased. Further, when packed data is transmitted, a data compression efficiency may be increased by a 45-degree rotation-transform effect, which has not been supported conventionally.

According to the embodiments, limited resources may be used efficiently by providing more information for a region having high visual importance.

Various components and modules of an entity, function, AP, server, or UE, as described in the present disclosure, may operate using hardware circuits, such as a combination of a hardware circuit, such as a complementary metal oxide semiconductor (CMOS)-based logic circuit, firmware, and software and/or hardware and firmware and/or software embedded in a machine-readable medium. For example, various electrical structures and methods may be implemented using electrical circuits such as transistors, logic gates, and application specific integrated circuits (ASICs).

While the present disclosure has been shown and described with reference to certain embodiments thereof, it will be understood by those skilled in the art that various changes in form and detail may be made therein without departing from the spirit and scope of the present disclosure as defined by the appended claims and their equivalents.

What is claimed is:

1. A method for transmitting information about an omni-directional image, by a server, based on user motion information, the method comprising:

receiving motion parameters from an apparatus for displaying an omni-directional image, the apparatus being worn by a user;

generating the user motion information based on the received motion parameters;

generating first packing information corresponding to a first user position corresponding to a first set of x, y, and z coordinates at a first time based on the user motion information;

generating second packing information corresponding to a second user position corresponding to a second set of x, y, and z coordinates, at a second time in close proximity to the first user position at the first time based on the user motion information;

generating third packing information based on the first packing information and the second packing information; and transmitting at least one of the first packing information, the second packing information, and the third packing information to the apparatus, wherein the first user position corresponding to the first set of x, y, and z coordinates is different than the second user position corresponding to the second set of x, y, and z coordinates, such that the first user position is offset from the second user position.

2. The method of claim 1, wherein the user motion information comprises information about at least one of the first user position at the first time, a user movement distance, a user movement direction, and a user speed.

3. The method of claim 2, further comprising:

generating first projection information corresponding to the first user position at the first time based on the user motion information; and generating second projection information corresponding to the second user position at the second time in close proximity to the first user position at the first time based on the user motion information, wherein each of the first projection information and the second projection information includes truncated square pyramid projection data converted from an omni-directional image of a cube projection based on the user movement distance or the user speed.

4. The method of claim 3, wherein the first packing information comprises first packed data generated by trapezoid packing of the first projection information, the second packing information comprises second packed data generated by trapezoid packing of the second projection information, and wherein each of the first packed data and the second packed data includes first to sixth regions, each of the first to sixth regions corresponding to one of a plurality of faces of the cube projection, the first and second regions are rectangles and correspond to faces of the cube projection facing each other, the third to sixth regions are trapezoids, and a size of the first region is equal to a sum of sizes of the second to sixth regions.

5. The method of claim 3, further comprising generating at least one second omni-directional image based on a plurality of first omni-directional images captured by a camera, wherein each of a plurality of regions corresponding to the plurality of first omni-directional images and the at least one second omni-directional image is divided into a plurality of sub-regions, and the omni-directional image of the cube projection is converted into truncated square pyramid projection data based on a sub-region in which the user is located among the plurality of sub-regions.

6. A server for transmitting information about an omni-directional image based on user motion information, the server comprising:

a transceiver;
a memory; and
at least one processor connected to the transceiver and the memory and configured to:

receive motion parameters from an apparatus for displaying an omni-directional image, the apparatus being worn by a user, generate the user motion information based on the received motion parameters, generate first packing information corresponding to a first user position corresponding to a first set of x, y, and z coordinates at a first time based on the user motion information, generate second packing information corresponding to a second user position corresponding to a second set of x, y, and z coordinates at a second time in close proximity to the first user position at the first time based on the user motion information, generate third packing information based on the first packing information and the second packing information, and transmit, to the apparatus, at least one of the first packing information, the second packing information, and the third packing information, wherein the first user position corresponding to the first set of x, y, and z coordinates is different than the second user position corresponding to the second set of x, y, and z coordinates, such that the first user position is offset from the second user position.

7. The server of claim 6, wherein the user motion information comprises information about at least one of the first user position at the first time, a user movement distance, a user movement direction, and a user speed.

8. The server of claim 7, wherein the at least one processor is further configured to:

generate first projection information corresponding to the first user position at the first time based on the user motion information, and generate second projection information corresponding to the second user position at the second time in close proximity to the first user position at the first time based on the user motion information, and wherein each of the first projection information and the second projection information includes truncated square pyramid projection data converted from an omni-directional image of a cube projection based on the user movement distance or the user speed.

9. The server of claim 8, wherein the first packing information comprises first packed data generated by trapezoid packing of the first projection information, the second packing information comprises second packed data generated by trapezoid packing of the second projection information, and wherein each of the first packed data and the second packed data includes first to sixth regions, each of the first to sixth regions corresponding to one of a plurality of faces of the cube projection, the first and second regions are rectangles and correspond to faces of the cube projection facing each other, the third to sixth regions are trapezoids, and a size of the first region is equal to a sum of sizes of the second to sixth regions.

10. The server of claim 8, wherein the at least one processor is further configured to generate at least one second omni-directional image based on a plurality of first omni-directional images captured by a camera, and wherein each of a plurality of regions corresponding to the plurality of first omni-directional images and the at least one second omni-directional image is divided into a plurality of sub-regions, and the omni-directional image of the cube projection is converted into truncated square pyramid projection data based on a sub-region in which the user is located among the plurality of sub-regions.

11. A method for displaying an image based on user motion information, by an apparatus for displaying an omni-directional image and worn by a user, the method comprising;

transmitting to a server, motion parameters obtained by analyzing a user motion;

receiving packing information from the server;

rendering a virtual reality (VR) image based on the received packing information; and displaying the rendered VR image, wherein the server is configured to generate the user motion information based on the motion parameters, generate first packing information corresponding to a first user position corresponding to a first set of x, y, and z coordinates at a first time based on the user motion information, generate second packing information corresponding to a second user position corresponding to a second set of x, y, and z coordinates at a second time in close proximity to the first user position at the first time based on the user motion information, and generate third packing information based on the first packing information and the second packing information, and wherein the packing information comprises at least one of the first packing information, the second packing information, and the third packing information, and wherein the first user position corresponding to the first set of x, y, and z coordinates is different than the second user position corresponding to the second set of x, y, and z coordinates, such that the first user position is offset from the second user position.

12. The method of claim 11, wherein the user motion information comprises information about at least one of the first user position at the first time, a user movement distance, a user movement direction, and a user speed.

13. The method of claim 12, wherein the server is further configured to generate first projection information corresponding to the first user position at the first time based on the user motion information, and generate second projection information corresponding to the second user position at the second time in close proximity to the first user position the first time based on the user motion information, and wherein each of the first projection information and the second projection information includes truncated square pyramid projection data converted from an omni-directional image of a cube projection based on the user movement distance or the user speed.

14. The method of claim 13, wherein the first packing information comprises first packed data generated by trapezoid packing of the first projection information, the second packing information comprises second packed data generated by trapezoid packing of the second projection information, and wherein each of the first packed data and the second packed data includes first to sixth regions, each of the first to sixth regions corresponding to one of a plurality of faces of the cube projection, the first and second regions are rectangles and correspond to faces of the cube projection facing each other, the third to sixth regions are trapezoids, and a size of the first region is equal to a sum of sizes of the second to sixth regions.

15. The method of claim 13, wherein the server is further configured to generate at least one second omni-directional image based on a plurality of first omni-directional images captured by a camera, and wherein each of a plurality of regions corresponding to the plurality of first omni-directional images and the at least one second omni-directional image is divided into a plurality of sub-regions, and the omni-directional image of the cube projection is converted into truncated square pyramid projection data based on a sub-region in which the user is located among the plurality of sub-regions.

16. An apparatus, worn by a user, for displaying an omni-directional image based on user motion information, the apparatus comprising;

a transceiver;

a memory; and at least one processor connected to the transceiver and the memory and configured to transmit, to a server, motion parameters obtained by analyzing a user motion, to receive packing information from the server, to render a virtual reality (VR) image based on the received packing information, and to display the rendered VR image, wherein the server is configured to generate the user motion information based on the motion parameters, generate first packing information corresponding to a first user position corresponding to a first set of x, y, and z coordinates at a first time based on the user motion information, generate second packing information corresponding to a second user position corresponding to a second set of x, y, and z coordinates at a second time in close proximity to the first user position at the first time based on the user motion information, and generate third packing information based on the first packing information and the second packing information, and wherein the packing information comprises at least one of the first packing information, the second packing information, and the third packing information, and wherein the first user position corresponding to the first set of x, y, and z coordinates is different than the second user position corresponding to the second set of x, y, and z coordinates, such that the first user position is offset from the second user position.

17. The apparatus of claim 16, wherein the user motion information comprises information about at least one of the first user position at the first time, a user movement distance, a user movement direction, and a user speed.

18. The apparatus of claim 17, wherein the server is further configured to generate first projection information corresponding to the first user position at the first time based on the user motion information, and generate second projection information corresponding to the second user position at the second time in close proximity to the first user position at the first time based on the user motion information, and wherein each of the first projection information and the second projection information includes truncated square pyramid projection data converted from an omni-directional image of a cube projection based on the user movement distance or the user speed.

19. The apparatus of claim 18, wherein the first packing information comprises first packed data generated by trapezoid packing of the first projection information, the second packing information comprises second packed data generated by trapezoid packing of the second projection information, and wherein each of the first packed data and the second packed data includes first to sixth regions, each of the first to sixth regions corresponding to one of a plurality of faces of the cube projection, the first and second regions are rectangles and correspond to faces of the cube projection facing each other, the third to sixth regions are trapezoids, and a size of the first region is equal to a sum of sizes of the second to sixth regions.

20. The apparatus of claim 18, wherein the server is further configured to generate at least one second omni-directional image based on a plurality of first omni-directional images captured by a camera, and wherein each of a plurality of regions corresponding to the plurality of first omni-directional images and the at least one second omni-directional image is divided into a plurality of sub-regions, and the omni-directional image of the cube projection is converted into truncated square pyramid projection data based on a sub-region in which the user is located among the plurality of sub-regions.

* * * * *